(12) United States Patent (10) Patent No.: US 12,090,502 B2
Zi et al. (45) Date of Patent: Sep. 17, 2024

(54) MOVABLE ELECTRO-HYDRAULIC COMPOSITE DRIVE SPRAYING ROBOT WITH LARGE WORKING SPACE

(71) Applicant: HEFEI UNIVERSITY OF TECHNOLOGY, Anhui (CN)

(72) Inventors: Bin Zi, Anhui (CN); Jiahao Zhao, Anhui (CN); Sen Qian, Anhui (CN); Zhengyu Wang, Anhui (CN); Feng Xu, Anhui (CN); Jingfeng Pan, Anhui (CN); Bin Zhou, Anhui (CN); Shanshan Jiang, Anhui (CN); Yuan Li, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 0 days.

(21) Appl. No.: 18/557,293

(22) PCT Filed: May 26, 2021

(86) PCT No.: PCT/CN2021/095897
§ 371 (c)(1),
(2) Date: Oct. 25, 2023

(87) PCT Pub. No.: WO2022/227158
PCT Pub. Date: Nov. 3, 2022

(65) Prior Publication Data
US 2024/0139767 A1 May 2, 2024

(30) Foreign Application Priority Data
Apr. 27, 2021 (CN) .......................... 202110466483.4

(51) Int. Cl.
*B05B 13/04* (2006.01)
*B25J 5/00* (2006.01)
(Continued)

(52) U.S. Cl.
CPC ........... *B05B 13/0431* (2013.01); *B25J 5/007* (2013.01); *B25J 9/104* (2013.01); *B25J 11/0075* (2013.01)

(58) Field of Classification Search
CPC ....... B05B 13/0431; B25J 5/007; B25J 9/104; B25J 11/0075
(Continued)

(56) References Cited

U.S. PATENT DOCUMENTS 4,721,630 A * 1/1988 Takeo ...................... B25J 15/00
239/751
4,762,013 A * 8/1988 Peter ..................... B05B 13/041
239/752
(Continued)

FOREIGN PATENT DOCUMENTS

CN 101966503 2/2011
CN 107008602 8/2017
(Continued)

OTHER PUBLICATIONS

"International Search Report (Form PCT/ISA/210) of PCT/CN2021/095897," mailed on Jan. 29, 2022, with English translation thereof, pp. 1-4.
(Continued)

*Primary Examiner* — Steven J Ganey
(74) *Attorney, Agent, or Firm* — JCIPRNET

(57) ABSTRACT

Provided is a movable electro-hydraulic composite drive spraying robot with a large working space, comprising movable bases, there being a plurality of movable bases cooperatively arranged for bearing a drive rope adjustment module, profile supporting columns in the driving rope adjusting module respectively being fixed on the movable bases, the plurality of movable bases encircling an operating space, a adjustable auxiliary motion platform that is mov-
(Continued)

able being erected in the operating space, a rotary motion platform being arranged below the adjustable auxiliary motion platform, the adjustable auxiliary motion platform and the rotary motion platform being connected by means of a hydraulic push rod, the bottom end surface of the rotary motion platform being provided with a spray gun, and a balance mechanism and a fixed support mechanism for balancing the traction force of the rope and maintaining the balance of the mechanism also being mounted on the movable bases.

10 Claims, 13 Drawing Sheets

(51) Int. Cl.
*B25J 9/10* (2006.01)
*B25J 11/00* (2006.01)

(58) Field of Classification Search
USPC ........... 239/69, 565, 722, 750–753; 118/323; 901/43
See application file for complete search history.

(56) References Cited

U.S. PATENT DOCUMENTS

| | | | | |
|---|---|---|---|---|
| 5,358,568 | A * | 10/1994 | Okano | B05B 15/68 |
| | | | | 118/323 |
| 11,919,019 | B2 * | 3/2024 | Raman | B25J 11/0075 |
| 2015/0217318 | A1 | 8/2015 | Letard et al. | |
| 2018/0169685 | A1 * | 6/2018 | Taylor | E04F 21/085 |
| 2021/0252542 | A1 * | 8/2021 | Sosa | B25J 19/02 |

FOREIGN PATENT DOCUMENTS

| | | |
|---|---|---|
| CN | 108942897 | 12/2018 |
| CN | 110252560 | 9/2019 |
| CN | 111360793 | 7/2020 |
| EP | 1614480 | 1/2006 |

OTHER PUBLICATIONS

"Written Opinion of the International Searching Authority (Form PCT/ISA/237) of PCT/CN2021/095897," mailed on Jan. 29, 2022, pp. 1-4.

\* cited by examiner

MOVABLE ELECTRO-HYDRAULIC COMPOSITE DRIVE SPRAYING ROBOT WITH LARGE WORKING SPACE

CROSS-REFERENCE TO RELATED APPLICATION

This application is a 371 of international application of PCT application serial no. PCT/CN2021/095897, filed on May 26, 2021, which claims the priority benefit of China application no. 202110466483.4, filed on Apr. 27, 2021. The entirety of each of the above-mentioned patent applications is hereby incorporated by reference herein and made a part of this specification.

TECHNICAL FIELD

The present disclosure relates to the field of robots, and mainly relates to a movable electro-hydraulic composite drive spraying robot with a large operating space.

DESCRIPTION OF RELATED ART

Spraying can bring the advantages of anti-rust and anti-corrosion to the workpiece to be processed, and can improve the appearance of the workpiece, and therefore has become an indispensable process in all walks of life. In the traditional industrial production, manual spraying is mainly used as the job mode. However, the manual spraying brings a certain harm to the workers, and the work efficiency is low, and the spraying quality is difficult to guarantee. Therefore, the spraying robots are constantly replacing the traditional manual spraying to achieve the purpose of improving production efficiency and ensuring stable product quality.

The existing spraying robots are mainly serial rigid robots, and most of them adopt the solution of adding the spray guns to the serial manipulators, which has high accuracy positioning, simple control process and is prone to implement, but the operating space of which is limited by the characteristics of the body, it is difficult to paint on larger surfaces, and the working blind spots are generated when facing the complex surfaces because of its low flexibility. The only way to expand its operating space and improve the performance is to increase the arm length or increase the number of joints, which further results in larger system inertia, lower rigidity, and lower end precision.

Due to these disadvantages of the serial spraying robot, in order to expand its operating space and optimize the motion performance, some designs of parallel spraying mechanisms such as the flexible-cable drive parallel spraying robot appear at present. However, when the existing flexible-cable drive mechanism faces a complex surface, the drive rope is extremely prone to interfere with the workpiece to be processed, which interferes with the spraying process. For example, the Chinese invention patent with the application number 202010243575.1 provides a hybrid spraying robot mechanism driven by flexible cables and the operating method thereof. The mechanism body is driven through the ropes, which has the advantages such as large operating space, but the spray gun at the tail end is not flexible enough when the mechanism faces the complex surface of the workpiece to be sprayed, and the drive ropes interfered with the workpiece is generated. The Chinese invention patent application number 201910641158.X provides a movable hybrid spraying robot for high-speed rail body painting. The operating space of the mechanism is limited by the rails, the actual movement mode at the tail end of the mechanism is approximated to that of the serial mechanical arm, and the operating space of the mechanism is limited to a certain extent. The Chinese invention patent application number CN201811064098.1 provides a wire-driven parallel spraying robot for the outer surface of the hull. The mechanism is mainly aimed at the curved surfaces on both sides of the ship, has a relatively low flexibility at the tail end, is not universal. Therefore, it is necessary to design a spraying robot that has a larger operating space and higher flexibility, and can avoid the interference between the drive rope and the workpiece.

SUMMARY

In order to eliminate the disadvantages in the prior art, the objectives of the present disclosure are to provide a movable electro-hydraulic composite drive spraying robot with a large operating space to implement the multi-free-of-freedom motion in a larger operating space and avoid the interference between the traction ropes and a machined workpiece.

The present disclosure is achieved by the following technical solutions.

Provided is a movable electro-hydraulic composite drive spraying robot with a large operating space. The robot comprises movable bases, drive rope adjustment modules, an adjustable auxiliary motion platform, a rotary motion platform, and adjustable auxiliary motion platform drive ropes and rotary motion platform drive ropes.

A plurality of movable bases are provided, and the drive rope adjustment modules are cooperatively installed on the movable bases, a number of the drive rope adjustment modules is the same as that of the moveable bases, profile supporting columns in the drive rope adjustment modules are respectively fixed on the moveable bases, and an operating space is formed by the plurality of movable bases, the movable adjustable auxiliary motion platform is erected in the operating space, the adjustable auxiliary motion platform is driven by the adjustable auxiliary motion platform drive ropes to move, the rotary motion platform is arranged below the adjustable auxiliary motion platform, the rotary motion platform is compositely-driven by the rotary motion platform drive ropes and a hydraulic push rod installed between the adjustable auxiliary motion platform and the rotary motion platform to move, so that a precise control of a multi-degree-of-freedom motion of the rotary motion platform is implemented, a spray gun is installed on a bottom end surface of the rotary motion platform, and balance mechanisms and fixing supporting mechanisms configured to balance traction forces of the ropes and maintain a balance of the mechanism are further installed on the moveable bases.

A number of the drive rope adjustment modules is four, each of the drive rope adjustment modules includes the profile supporting column, and a pulley configured to bear the adjustable auxiliary motion platform drive rope is installed on a top end part of the profile supporting column through a fixed pulley fixing base, a bottom end of the adjustable auxiliary motion platform drive rope is wound on a winding shaft of a motor drive, a synchronous belt vertically arranged is installed on the profile supporting column below the fixed pulley fixing base, a movable pulley configured to bear the rotary motion platform drive rope is installed on the synchronous belt, and a bottom end of the rotary motion platform drive rope is wound on a winding shaft of another motor drive.

Each of the movable bases includes a movable base body, a movable base body cover plate is installed on the movable base body, a fixing supporting mechanism is installed inside the movable base body surroundedly, the fixing supporting mechanism includes fixing supporting plates arranged at intervals, the fixing supporting plates are rotated to parallel to ground by a manual operation and locked to increase a stability of the mechanism, the balance mechanism is installed on an upper end surface of the movable base body cover plate, and a liftable universal wheel assembly is installed at a bottom end of the movable base body.

A rotating shaft is arranged on both sides of each of the fixing supporting plates, and the fixing supporting plate is rotated around the rotating shafts, the movable base body is provided with positioning holes corresponding to the rotating shafts, the rotating shaft is rotatably installed in the positioning holes through fixing-supporting-plate rotating bearings, the movable base body below the positioning holes is provided with square grooves, retaining springs are arranged in the square grooves, and the retaining springs are connected with spring resistance buckles arranged in elastic guide.

Each of the balance mechanisms includes a balance mechanism rotating platform, one end of the balance mechanism rotating platform is rotatably installed on the movable base body cover plate through a balance mechanism rotating shaft, the balance mechanism rotating shaft is driven by a balance mechanism rotating motor to rotate, a balance mechanism lead screw is rotatably installed inside the balance mechanism rotating platform, a balance mechanism lead screw slider is guidedly installed on the balance mechanism lead screw, a counterweight bearing platform is installed on the balance mechanism lead screw slider, a balance mechanism counterweight is installed on the counterweight bearing platform, a spherical joint is respectively installed on both sides of a bottom end of the balance mechanism lead screw slider, a rotating end of the spherical joint is connected with a telescopic supporting rod, and a two-way hinge is installed at another end of the telescopic supporting rod, the two-way hinge is connected inside a bearing of the corresponding hole of the moveable base body, and the balance mechanism lead screw is driven by a balance mechanism lead screw drive motor at an end of the balance mechanism.

Each of the universal wheel assembly includes a liftable moving wheel frame, a top part of the liftable moving wheel frame is fixedly installed on a bottom part of the movable base body, and a universal wheel drive motor bracket capable of guidedly-moving is installed inside the liftable moving wheel frame, a universal wheel drive motor is fixedly installed on the universal wheel drive motor bracket, and a universal wheel is installed at an output shaft end of the universal wheel drive motor, and the universal wheel drive motor bracket is driven by a universal wheel lifting ball lead screw nut to lift and lower and is guided by a universal wheel lifting sliding column.

Each of the adjustable auxiliary motion platform drive rope is driven by one motor in the drive rope adjustment module to protrude from the drive rope adjustment module to connect on the adjustable auxiliary motion platform drive rope hook, so as to drive the adjustable auxiliary motion platform to move; each of the rotary motion platform drive ropes is driven by another motor in the drive rope adjustment module to protrude from the drive rope adjustment module to wind through a transition pulley on the adjustable auxiliary motion platform, so as to restrict and adjust a spatial position of the rope, and eventually the rotary motion platform drive rope is connected to the rotary motion platform to drive the rotary motion platform to move together with the hydraulic push rod; and rope tension sensors configured to monitor and feed back rope tensions in real time are installed on the adjustable auxiliary motion platform drive ropes and the rotary motion platform drive ropes respectively.

The adjustable auxiliary motion platform includes an adjustable auxiliary motion platform inner plate, an adjustable auxiliary motion platform outer frame with adjustable size is installed outside the adjustable auxiliary motion platform inner plate, the adjustable auxiliary motion platform drive rope hooks symmetrically distributed in a rectangular shape are installed on an upper end surface of the adjustable auxiliary motion platform outer frame, rotary motion platform drive rope transition pulley bases configured to install transition pulleys distributed in a circumference are installed on a bottom end part of the adjustable auxiliary motion platform outer frame, each side of the adjustable auxiliary motion platform outer frame is disconnected at a middle part and the disconnected parts of each side are abutted and adjusted through the auxiliary motion platform ball screw therebetween, and the adjustable auxiliary motion platform is guided through a moving slide rail distributed in radial during adjustment.

One end of the auxiliary motion platform ball lead screw is connected with an output shaft end of an outer adjustment mechanism drive motor through a coupling, the outer adjustment mechanism drive motor is installed in a slot at a boundary beam of the adjustable auxiliary motion platform outer frame at the disconnected side, a guide shaft is connected at another end of the auxiliary motion platform ball lead screw, the guide shaft is guidedly and rotatably installed in a sliding bearing in a stepped inner hole at a boundary beam of the adjustable auxiliary motion platform outer frame at another side, the auxiliary motion platform ball lead screw is screwed with the auxiliary motion platform lead screw nut, the auxiliary motion platform lead screw nut is fixedly connected to a boundary beam of the adjustable auxiliary motion platform outer frame where the guide shaft is located through the screws, the auxiliary motion platform ball lead screw is driven by the outer adjustment mechanism drive motor to rotate and cooperated with the guiding of the sliding column above and below the ball lead screw to move of the auxiliary motion platform lead screw nut, so that the boundary beam of the adjustable auxiliary motion platform outer frame at another side is driven for moving to adjust the adjustable auxiliary motion platform outer frame, the moving slide rail includes an outer sleeve pipe and an inner pipe body that are guided and cooperated with each other, the outer sleeve pipe is fixed on a bottom end surface of the adjustable auxiliary motion platform inner plate, and an end of the inner pipe body is connected with the adjustable auxiliary motion platform outer frame.

A rotary platform rotating shaft is rotatably installed at a middle of the rotary motion platform, and an upper end of the rotary platform rotating shaft is connected to a bottom end part of the hydraulic push rod through a universal joint, pulley bases arranged at intervals are installed on an upper end surface of the rotary motion platform in a circumferential direction, rotary motion platform drive rope pulleys are installed on the pulley bases, a rotary motion platform housing is installed on bottom end surfaces of the rotary motion platform drive rope pulleys, and a lower end part of the rotary platform rotating shaft is located inside the rotary motion platform housing, and steering angle sensors configured to measure an angle of the rotary motion platform relative to the rotary platform rotating shaft and a flexural spring configured to cooperate to complete the rotational movement in cooperation are further installed inside the rotary motion platform housing.

A pulley base rotating shaft is installed at a bottom end of each of the pulley bases, and an upper end part of the pulley base rotating shaft is rotatably press-fitted on the rotary motion platform through a rotary platform upper bearing and a rotary platform upper bearing end cover, a lower end part of the pulley base rotating shaft is rotatably press-fitted at a middle part of the rotary motion platform housing through a rotary platform lower bearing and a rotary platform lower bearing end cover, two wing-plates arranged in a staggered manner are protruded from the rotary motion platform rotating shaft and the rotary motion platform housing, a circular-ring-shaped flexural spring bracket is arranged between an upper wing-plates of the rotary platform rotating shaft and the rotary motion platform housing, and the circular-ring-shaped flexural spring bracket passing through holes on the two wing plates is slidable around the holes, the flexural spring is sleeved on the spring bracket, and the flexural springs are all semicircular, and one end of the flexural spring is connected to the wing plate of the rotary platform rotating shaft, and another end of the flexural spring is connected to the wing plate of the rotary motion platform housing, and a middle of the flexural spring is passed through the flexural spring bracket to limit, and cooperated with an action of rotary motion platform drive rope to supply a force for a rotation of the rotary motion platform, the four flexural springs divided into two groups are respectively arranged on two groups of the wing plates in an upper-lower staggered manner to improve a stability of the flexural springs at different rotation angles, a rotary motion platform bottom end cover is installed on a bottom end part of the rotary motion platform housing, and a spray gun is installed at a bottom end of the rotary motion platform bottom end cover.

The utilizing process of the spraying robot in the above-mentioned structure is specifically as follows.

In S1, a system is initialized. A workpiece to be sprayed is placed in a fixed position, a position parameter for the workpiece is determined, and the position parameter is inputted into an upper computer of a control system.

In S2, a position of a main area in the operating space is determined by the upper computer, according to the position parameter for the workpiece. The balance mechanisms in the movable bases are started, and counterweights are adjusted to balance tensions according to a position and a shape of the mechanism, the robot is driven by each of the movable bases to move as a whole to a designated area.

In S3, the universal wheels in each of the movable bases are lifted off the ground after the movable bases are moved to the designated area, and the fixing supporting mechanisms are opened.

In S4, the shape and attitude parameters for the workpiece to be sprayed are inputted into the upper computer for analyzing.

In S5, a drive rope position adjustment module is driven to adjust an outlet cable point position under a control of the upper computer, according to an approximate shape and attitude parameters for the workpiece to be sprayed, and while the auxiliary motion platform is adjusted and an entire size of the frame is adjusted to adapt to processing requirements for the workpieces with different shapes and sizes.

In S6, a length of the drive rope is changed under a driving of the motor to control the auxiliary motion platform and the rotary motion platform to move, and while a movement of the rotary motion platform is also driven by the hydraulic push rod.

In S7, during the movement of the rotary motion platform, the spray gun is moved with the movement of the rotary motion platform, and a feasible spraying task in a currently operating space is completed. Data are collected by the tension sensors and the steering angle sensors and the like, and are outputted into the upper computer to control the balance mechanism to adjust with the movement of the end, which prevents the mechanism from rolling over and ensures that the interference and other conditions affecting the movement are not existed.

In S8, the spraying task for the entire workpiece cannot be completed when the workpiece is too large to be covered by the robot through one movement of each of the movable bases. At this time, the fixed state of the robot is resolved by the movable bases to move to a new operation position, and steps are started from S2 until the spraying task for the overall workpiece is complete.

The movable electro-hydraulic composite drive spraying robot with a large operating space designed by the present disclosure can implement the adjustment on the overall operating space of the mechanism through installing the rope drive motors and the drive rope position adjustment modules on the movable bases, thereby satisfying the requirements for the large operating space. And the stability of the robot is maintained during the period when the robot moves and sprays with the help of the balance mechanisms and the fixing supporting mechanisms. The composite drive mode combing the rope drive driven by the motors and the hydraulic push rod is adopted, which not only ensures the operating space of the system, but also improves the spraying accuracy and the dynamic performance. The drive ropes are limited with the help of the auxiliary motion platform, which avoids the interference between the drive ropes and the workpiece. The rotational freedom of the tail end spray gun is increased by adding the spring into the end platform, which implements a more complex motion posture.

The advantages of the present disclosure are as follows.

1. The robot is installed on the four movable bases as a whole, and a large range motion of the robot system is implemented with the help of the movements of the movable bases as a whole, so that the robot has a large operating space. And the balance mechanisms are designed in the movable bases to balance the traction forces of the ropes on the movable bases to prevent the mechanism from rolling over, and a fixed supporting system is further designed to improve the stabilities of the moveable bases during the movable bases are fixed.

2. The rotary motion platform adopts the electro-hydraulic composite drive mode combing the motor-driven rope drive and hydraulic push rod. The hydraulic push rod is connected to the auxiliary motion platform and the rotary motion platform respectively, which ensures the operating space of the system and improves the spraying accuracy and the dynamic performance.

3. The rotary motion platform drive ropes are limited by the pulleys on the auxiliary motion platform, which can implement the direction change of the drive ropes in space, effectively avoid the interference between the rotary motion platform drive ropes and the workpiece to be sprayed when the complex curved surface is sprayed and improve the suitability of the equipment.

4. The systems such as the coating system can be fixed on the auxiliary motion platform to improve the motion stability of the auxiliary motion platform without affecting the motion performance of the tail end spraying platform, and the follow-up of the coating system and the end spray gun can be implemented, so as to spray the large surface, and when a large range movement is required, the robot is not limited by the coating system.

5. The flexural spring provided inside the rotary motion platform cooperates with the drive ropes connected in a staggered manner, which can implement that the rotary motion platform drive rope is rotated around the rotating shaft, without adding the active driving elements, so as to implement the six-degree-of-freedom movement of the end spray gun.

6. The position of the outlet cable point and the shape of the auxiliary motion platform are adjustable, which can satisfy the operation requirements for workpieces with different forms, and the adjustment mechanism is simple and prone to operate, improving the flexibility and adaptability of the robot.

BRIEF DESCRIPTION OF THE DRAWINGS

FIG. 4A illustrates a component diagram of the spring rotary mechanism.

DESCRIPTION OF THE EMBODIMENTS

The specific implementations of the present disclosure are provided below, and described with reference to the accompanying drawings.

Figure 1:
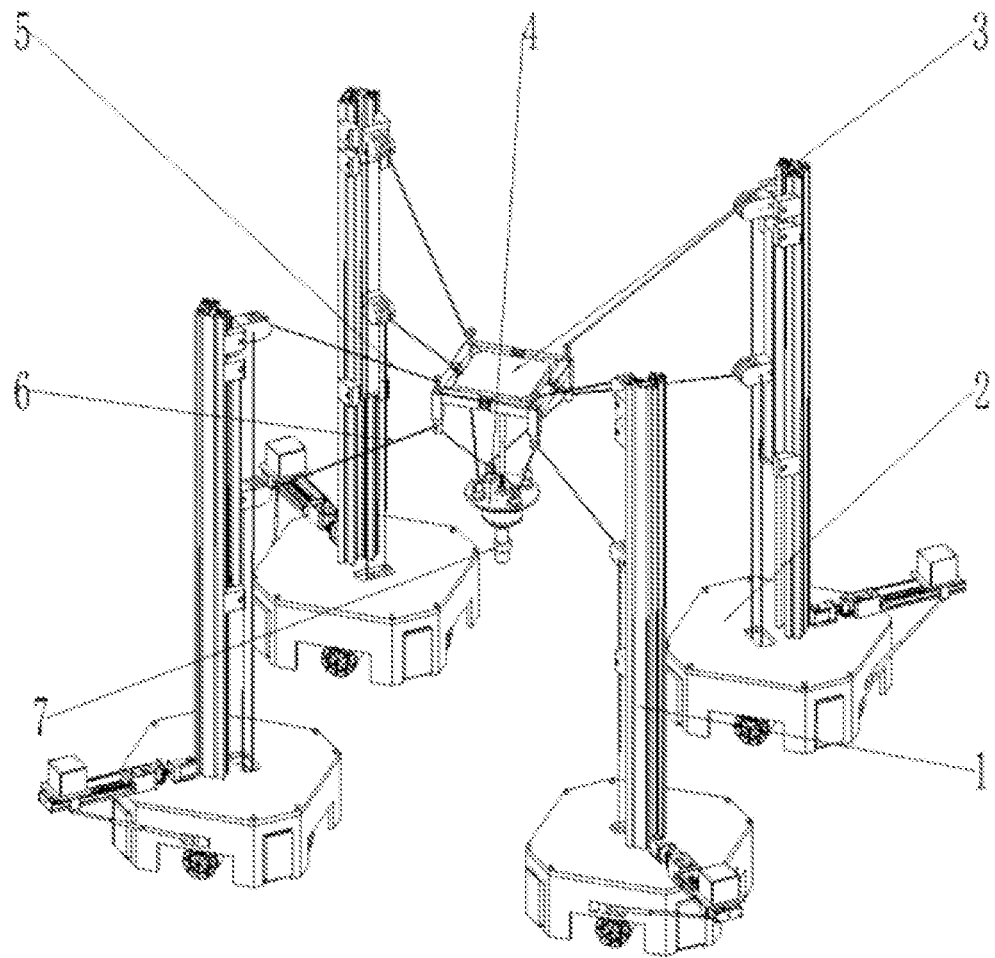
FIG. 1 illustrates a diagram of an entire structure of the present disclosure.
Figure 2:
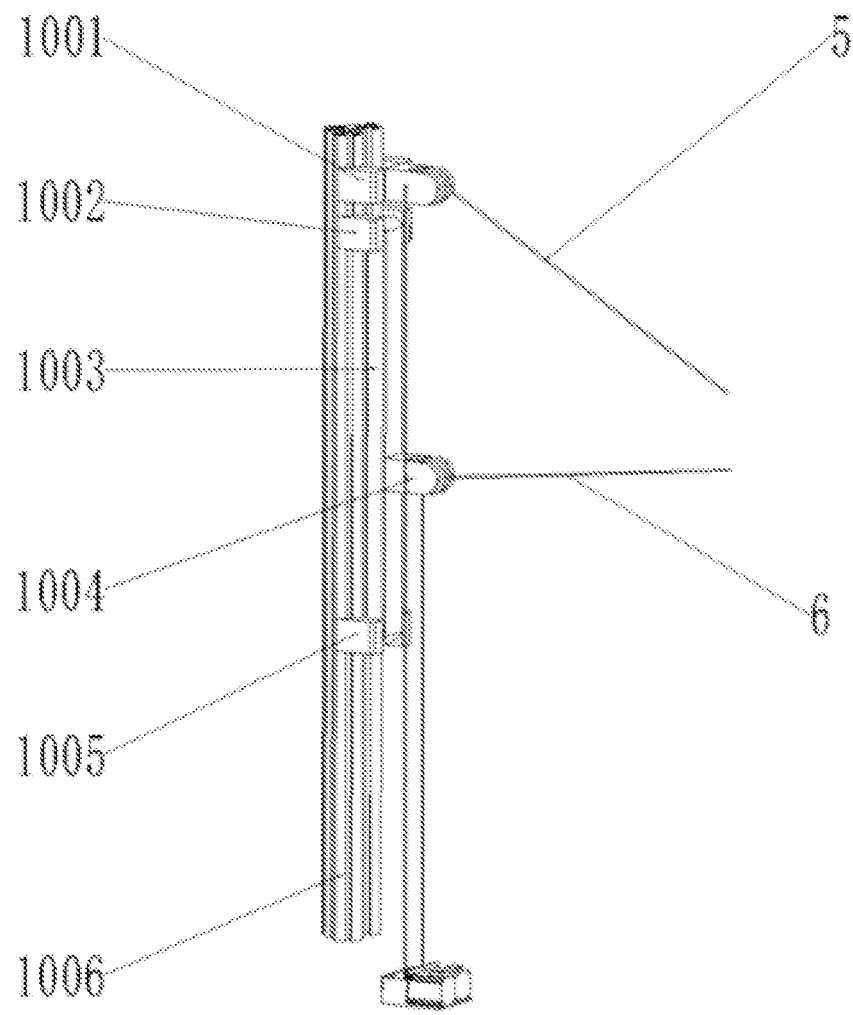
FIG. 2 illustrates a structural diagram of a drive rope position adjustment module.

With reference to FIG. 1, a movable electro-hydraulic composite drive spraying robot with a large operating space includes four identical drive rope position adjustment modules 1, four identical movable bases 2, an adjustable auxiliary motion platform 3, a rotary motion platform 4, four adjustable auxiliary motion platform drive ropes 5, four rotary motion platform drive ropes 6, and a spray gun 7.

Further, the four moveable bases 2 are configured to bear other mechanisms, and the profile supporting columns 1006 corresponding to the four drive rope adjustment modules 1 are fixed on the movable bases 2 through the installation holes reserved on the movable bases 2, which implements a large range motion of the robot as a whole. Each of the adjustable auxiliary motion platform drive rope 5 is driven by one motor in the drive rope adjustment module 1 to protrude from the drive rope adjustment module 1 to connect on an adjustable auxiliary motion platform drive rope hook 3002, so as to drive the adjustable auxiliary motion platform 3 to move. Each of the rotary motion platform drive rope 6 is driven by the other motor in the drive rope adjustment module 1 to protrude from the drive rope adjustment module 1 to wind through the rotary motion platform drive rope transition pulley 3004, so as to restrict and adjust the position of the rope, and eventually the rotary motion platform drive rope 6 is connected to the rotary motion platform 4 to drive the rotary motion platform 4. The adjustable auxiliary motion platform 3 is connected with the rotary motion platform 4 through a hydraulic push rod 4001, so as to further control the rotary motion platform 4 precisely, and the spray gun 7 is installed on the rotary motion platform 4 through bolts.

With reference to FIG. 2, FIG. 3, FIG. 4, and FIG. 5, each of the drive rope position adjustment module 1 includes a fixed pulley fixing base 1001, a synchronous belt upper base 1002, a synchronous belt 1003, a movable pulley 1004, a synchronous belt lower base 1005, and a profile supporting column 1006, a pulley 1101, a fixed pulley base 1102, a screw 1103, a left drive rope servo motor 1201, a dual-motor bracket 1202, winding shaft couplings 1203, a left winding shaft 1204, a right winding shaft 1205, a right drive rope servo motor 1206, a synchronous belt fixing base 1301, a synchronous belt drive motor 1302, a synchronous belt drive motor coupling 1303, and a synchronous belt wheel 1304.

Further, the adjustable auxiliary motion platform drive rope 5 is connected to the left winding shaft 1204, and is protruded from the left winding shaft 1204 to wind on the pulley 1101 through a small hole in the fixed pulley base 1102 to protrude, the fixed pulley base 1102 is fixedly connected on the fixed pulley fixing base 1001, the profile supporting column 1006 is provided with the installation hole, and the fixed pulley fixing base 1001 is installed on the profile supporting column 1006 through the set screw. The rotary motion platform drive rope 6 is connected to the right winding shaft 1205, and is protruded from the right winding shaft 1205 to wind on the pulley through the movable pulley 1004 to protrude. The movable pulley 1004 is fixedly connected on the synchronous belt 1003, and moved with the synchronous belt 1003, so as to achieve a purpose of adjusting an outlet cable point of the rotary motion platform drive rope 6. The synchronous belt mechanism is fixedly connected on the profile supporting column 1006 by the bolts with the help of the synchronous belt upper base 1002 and the synchronous belt lower base 1005.

Figure 3:
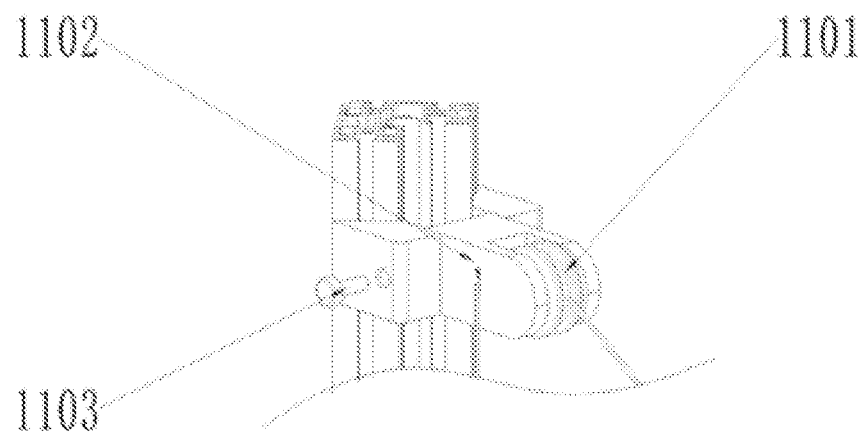
FIG. 3 illustrates a component diagram of a fixed pulley and an installation assembly thereof.

In further detail, with reference to FIG. 3, the pulley 1101 is installed on the fixed pulley base 1102 through the bearing and the rotating shaft, the fixed pulley base 1102 and the fixed pulley fixing base 1001 are all provided with threaded holes, and the fixed pulley base 1102 is connected with the fixed pulley fixing base 1001 by the screw.

Figure 4:
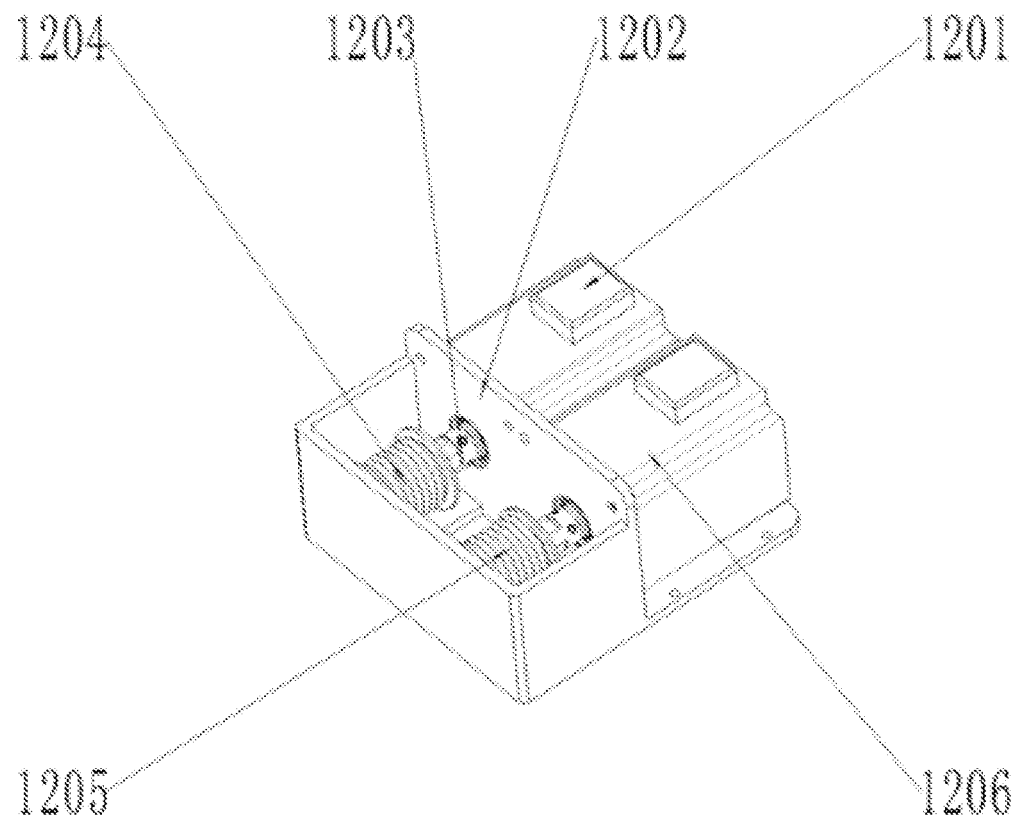
FIG. 4 illustrates a component diagram of a dual-drive motor.

In further detail, with reference to FIG. 4, two identical motors that are left drive rope servo motor 1201 and the right drive rope servo motor 1206 are installed on the dual-motor bracket 1202 through the bolts, and are respectively connected to the left winding shaft 1204 and the right winding shaft 1205 through two identical winding shaft couplings 1203, and eventually the adjustable auxiliary motion platform drive ropes 5 and the rotary motion platform drive ropes 6 are finally driven by the left drive rope servo motor 1201 and the right drive rope servo motor 1206.

Figure 5:
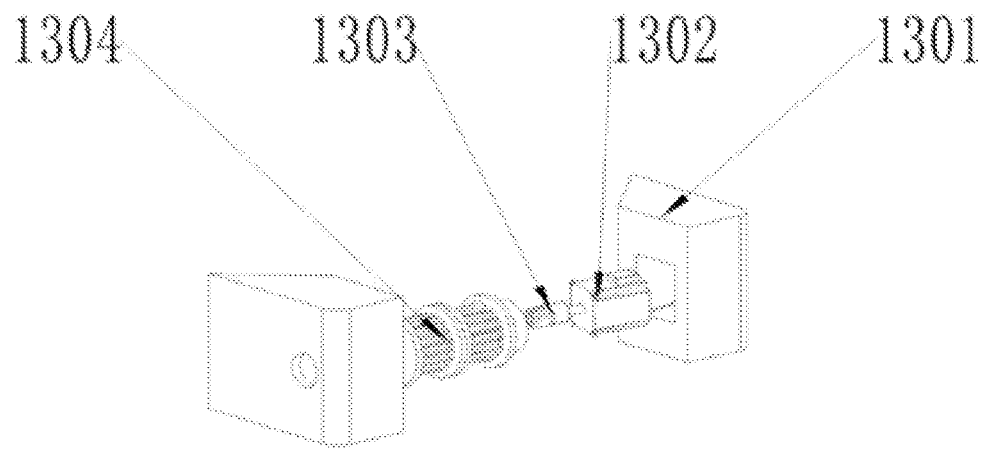
FIG. 5 illustrates a component diagram of the synchronous belt mechanism.
Figure 6:
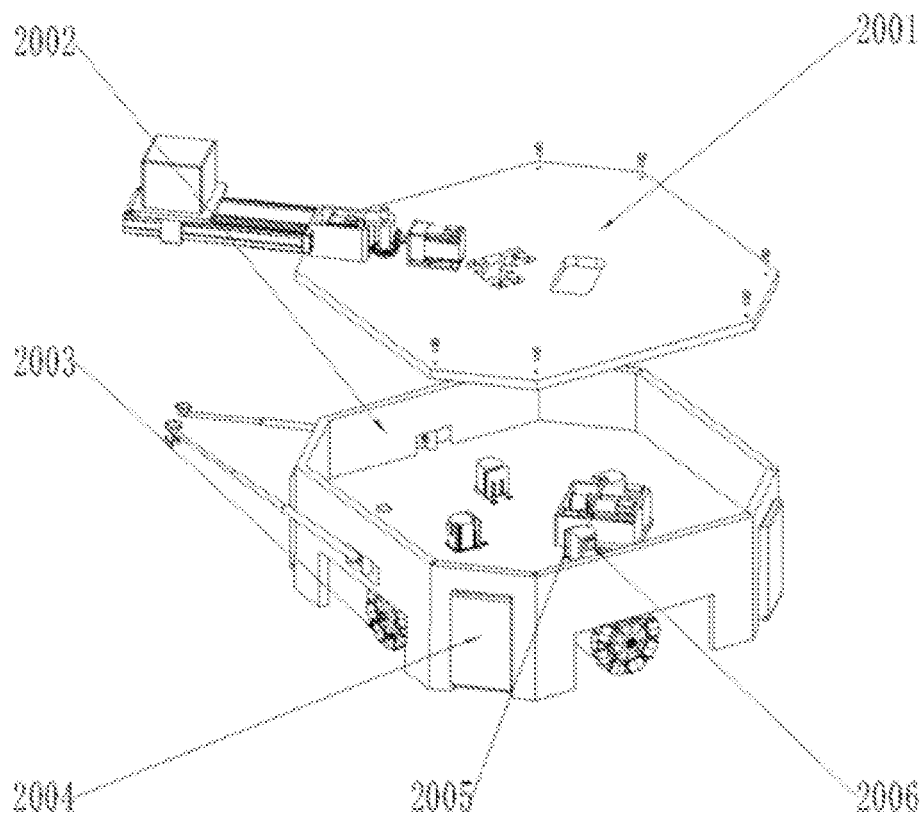
FIG. 6 illustrates a structural diagram of a movable base.
Figure 7A:
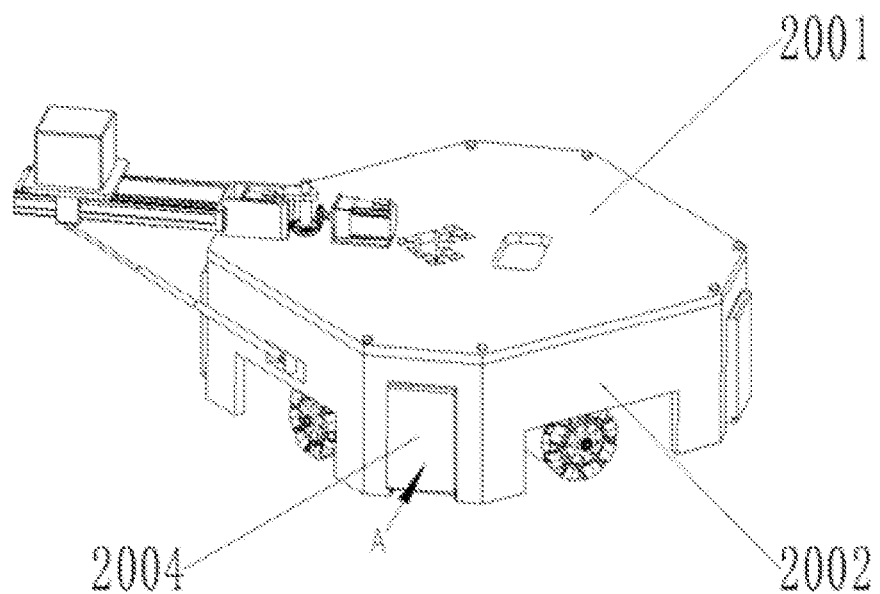
FIG. 7A illustrates a structural diagram when the fixing supporting mechanism of the moveable base is locked.
Figure 7B:
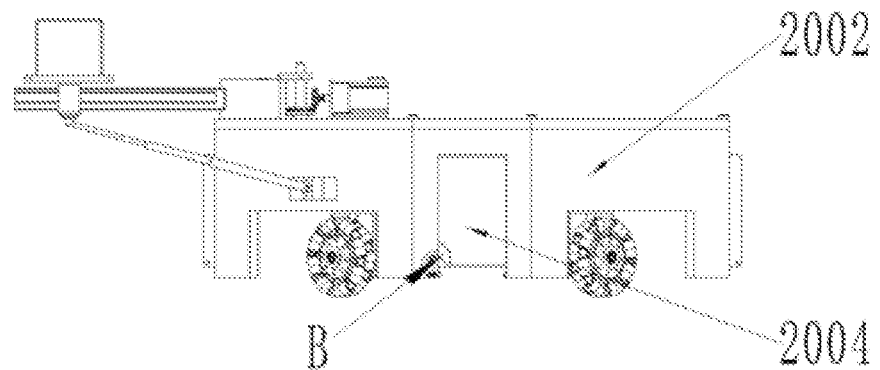
FIG. 7B illustrates a front view of A direction in FIG. 7A.
Figure 7C:
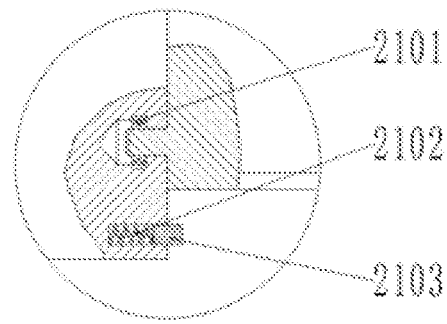
FIG. 7C illustrates an enlarged view of a partial structure at B in 7B.
Figure 7D:
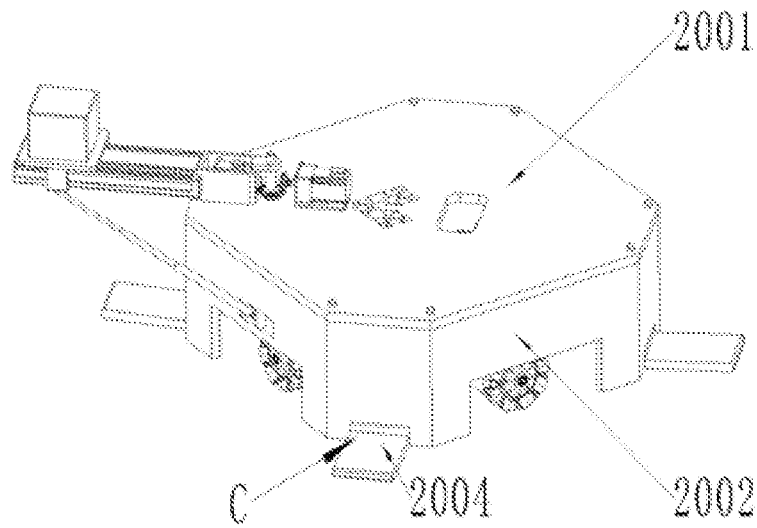
FIG. 7D illustrates a structural diagram when the fixing supporting mechanism of the moveable base moves.
Figure 7E:
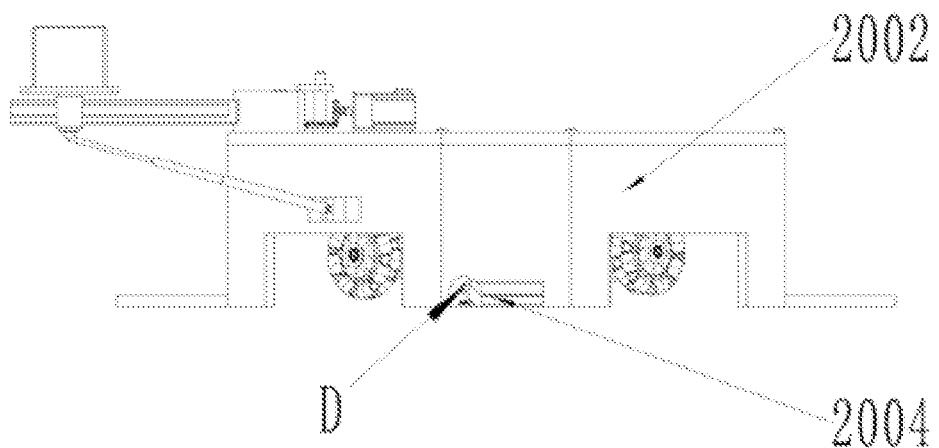
FIG. 7E illustrates a front view of C direction in FIG. 7D.
Figure 7F:
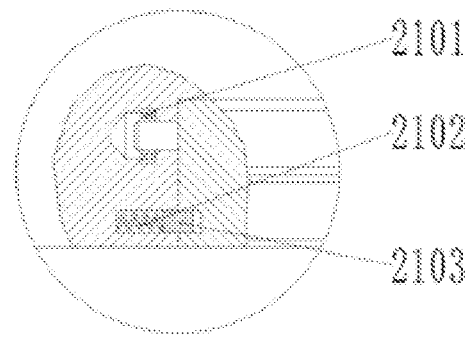
FIG. 7F illustrates an enlarged view of a partial structure at D in FIG. 7E.

In further detail, with reference to FIG. 5, the synchronous belt mechanism includes two sets of synchronous belt drive components that are arranged symmetrically up and down. That is, the synchronous belt drive motor 1302 is installed in the fixing slot of the synchronous belt fixing base 1301, and the synchronous belt wheel 1304 is driven by the synchronous belt drive motor 1302 to move through the synchronous belt drive motor coupling 1303.

With reference to FIG. 6, FIG. 7A to FIG. 7F, FIG. 8, and FIG. 9, each of the movable bases 2 includes a movable base body cover plate 2001, a movable base body 2002, a universal wheel 2003, fixing supporting plates 2004, a universal wheel lifting motor bracket 2005, a universal wheel lifting motor 2006, fixing-supporting-plate rotating bearings 2101, retaining springs 2102, spring resistance buckles 2103, a balance mechanism rotating motor 2201, a balance mechanism rotating motor bracket 2202, a balance mechanism rotating platform 2203, a balance mechanism lead screw drive motor 2204, a balance mechanism lead screw 2205, a balance mechanism counterweight 2206, a counterweight bearing platform 2207, a balance mechanism lead screw slider 2208, a balance mechanism slide rail 2209, spherical hinges 2210, telescopic supporting rods 2211, two-way hinges 2212, a balance mechanism rotating shaft 2213, a big bevel gear 2214, a small bevel gear 2215, a liftable moving wheel framework 2301, a universal wheel lifting sliding column 2302, a universal wheel drive motor 2303, a universal wheel drive motor bracket 2304, a universal wheel lifting ball lead screw nut 2305, a universal wheel lifting ball lead screw 2306, and a universal wheel lifting motor coupling 2307.

Further, the movable base body cover plate 2001 is installed on the movable base body 2002 by the screws. Four fixing supporting plates 2004 are symmetrically arranged on the movable base body 2002 in a ring shape, and are rotatably around the fixing-supporting-plate rotating bearing 2101 installed on the movable base body 2002. When the movable base moves, the supporting plates are perpendicular to the ground and are extremely close to the side wall of the movable base body 2002. When the robot moves to the operating position as a whole, the fixing supporting plates 2004 are manually switched to parallel to the ground and are locked, which increases the stability of the mechanism. The balance mechanism rotating motor 2201 is fixedly installed on the movable base body cover plate 2001 through the balance mechanism rotating motor bracket 2202, and is configured to drive the balance mechanism to rotate as a whole. The telescopic supporting rod 2211 is connected on the movable base body 2002 through the two-way hinge 2212 to provide support for the balance mechanism. Four groups of the liftable moving wheel components are symmetrically fixed on the plane plate of the movable base body 2002 by screws, and the mechanism is capable of implementing the rotation of the universal wheels 2003, and the universal wheels 2003 are driven by the mechanism to lift and lower, so that the mechanism has a better stability with no motion of the movable base 2.

Further, with reference to FIG. 7A to FIG. 7F, the fixing-supporting-plate rotating bearing 2101 is installed in the positioning hole in the movable base body 2002, and cooperated with the rotation shaft protruding from the fixing supporting plate 2004, so that the fixing supporting plate 2004 is rotatable around the rotation shaft. The retaining spring 2102 and the spring resistance buckle 2013 are installed in the square groove of the movable base body 2002. When the fixing supporting plate 2004 moves to an angle perpendicular to the side wall of the movable base body 2002, the spring resistance buckle 2103 is snapped into the corresponding slot of the fixing supporting plate 2004 under the pushing of the retaining spring 2102, thereby restricting its movement. FIG. 7A to FIG. 7F specifically illustrate the process that when the system is converted from the moving state to the locked state, the universal wheel 2003 is lifted off the ground, and the fixing supporting plate 2004 is rotated to contact the ground and locked.

Figure 8:
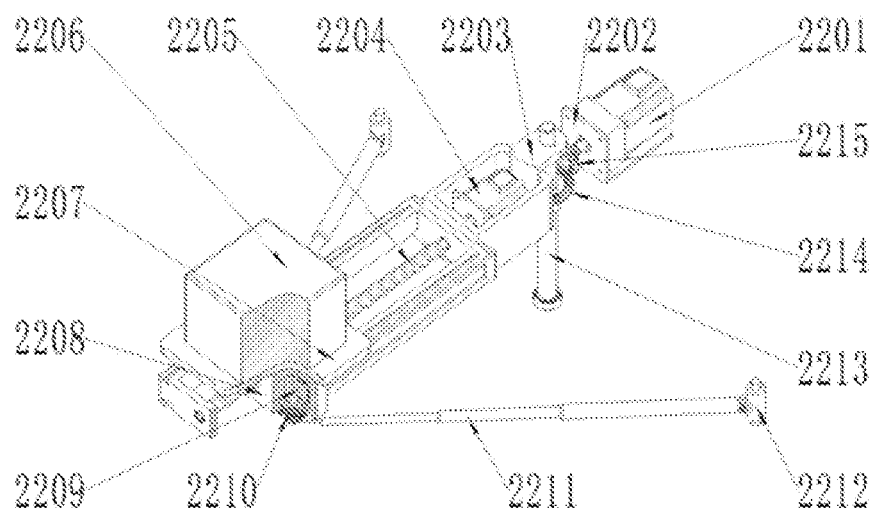
FIG. 8 illustrates a structural diagram of the balance mechanism of the moveable base.

In further detail, with reference to FIG. 8, the balance mechanism rotating motor 2201 is fixed on the balance mechanism rotating motor bracket 2202, the balance mechanism rotating motor bracket 2202 is connected with the movable base body cover plate 2001 through the screws. The balance mechanism rotating motor 2201 drives the small bevel gear 2215 through the coupling and further drives the big bevel gear 2214 engaged with small bevel gear 2215. The big bevel gear 2214 is connected and transmitted with the balance mechanism rotation shaft 2213 through a key. The balance mechanism rotation shaft 2213 is rotated through the bearings on the movable base body cover plate 2001 and the movable base body 2002. The balance mechanism rotating platform 2203 is connected and transmitted with the balance mechanism rotation shaft 2213 through a key as well. The balance mechanism lead screw drive motor 2204 is fixed in the slot of the balance mechanism rotating platform 2203, and is connected to the balance mechanism lead screw 2205 and drives the balance mechanism lead screw 2205 for rotating through the coupling. One end of the balance mechanism lead screw 2205 is fixed in the bearing of the hole corresponding to the balance mechanism rotating platform 2203, and the other end of the balance mechanism lead screw 2205 is fixed in the bearing of the hole corresponding to the balance mechanism slide rail 2209. The balance mechanism slide rail 2209 is fixed on the balance mechanism rotating platform 2203 by the screws. An internal of the balance mechanism lead screw slider 2208 is in cooperatively transmission with the balance mechanism lead screw 2205 through the lead screw nut, and an external of the balance mechanism lead screw slider 2208 is cooperated with the sliding rail in the balance mechanism slide rail 2209 to implement a linear movement of the balance mechanism lead screw slider 2208. The balance mechanism counterweight 2206 is installed on the counterweight bearing platform 2207, and the counterweight bearing platform 2207 is installed on the balance mechanism lead screw slider 2208 through the screws and is moved with the balance mechanism lead screw slider 2208. Two identical spherical joints 2210 are fixedly connected under the balance mechanism lead screw slider 2208 by the screws, and synchronously moved with the balance mechanism lead screw slider 2208. A rotation end of the spherical joint 2210 is connected with the telescopic supporting rod 2211, and the two-way hinge 2212 is connected at the end of the telescopic supporting rod 2211, thereby implementing the two-degree-of-freedom motion. The two-way spherical joint 2212 is connected in the bearing in the holes corresponding to the movable base body 2002. The entire rotation of the mechanism is implemented driven by the balance mechanism rotating motor 2201 with the help of the transmission of the bevel gears. The linear motion of the balance mechanism lead screw slider 2208 is implemented driven by the balance mechanism lead screw drive motor 2204, which drives the balance mechanism counterweight 2206 to move. The adjustment on the position of the balance mechanism counterweight 2206 is implemented through the rotating of the mechanism and the linear motion of the balance mechanism lead screw slider 2208, thereby cooperating with the change on the traction force of the balance rope, improving the stability of the mechanism and preventing the mechanism from rolling over. One end of the telescopic supporting rod 2211 is connected to the spherical joint 2210 and is moved with the balance mechanism lead screw slider 2208, and the other end of the telescopic supporting rod 2211 is connected to the two-way spherical joint 2212 to rotate with two-degree-of-freedom, which implements the adjustment on the length of the telescopic supporting rod with the attitude position of the balance mechanism, provides the support for the entire balance mechanism, maintains the stability of the balance mechanism, and prevents the balance mechanism lead screw 2205 and the balance mechanism slide rail 2209 from being bent caused by excessive load.

Figure 9:
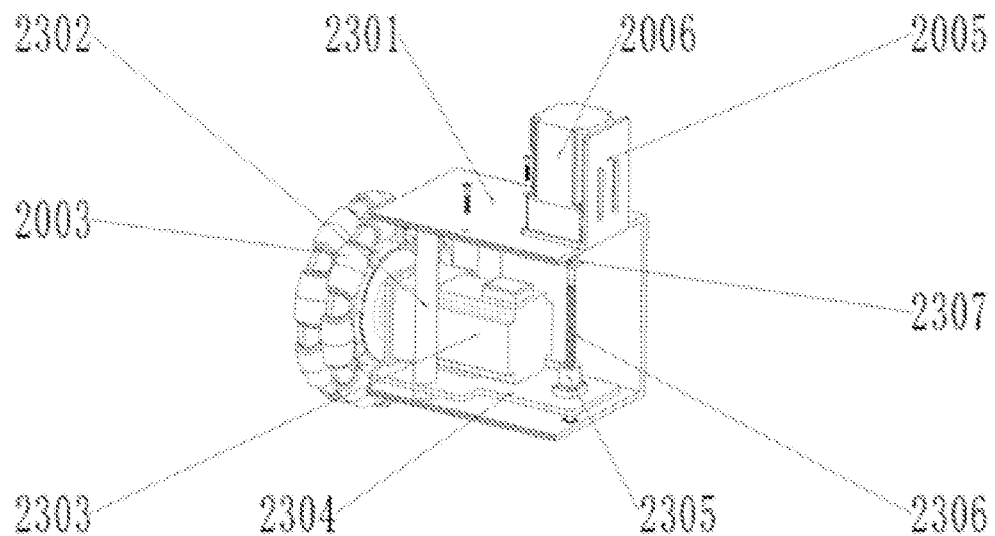
FIG. 9 illustrates a component diagram of a liftable moving wheel.

In further detail, with reference to FIG. 9, installation holes are reserved at the top of the liftable moving wheel framework 2301, and the liftable moving wheel framework 2301 is installed at the bottom of the movable base body 2002 through bolts. The universal wheels 2003 are connected on the universal wheel drive motor 2303, and are driven by the universal wheel drive motor 2303. The universal wheel drive motor 2303 is installed on the universal wheel drive motor bracket 2304 through bolts, and the universal wheel drive motor bracket 2304 is connected with the universal wheel lifting ball lead screw nut 2305 through bolts, and is driven by the universal wheel lifting ball lead screw nut 2305 for moving. One end of the universal wheel lifting ball lead screw 2306 is driven by the universal wheel lifting motor 2006 through the universal wheel lifting motor coupling 2307, and the other end of the universal wheel lifting ball lead screw 2306 is installed in the bearing in the bottom hole of the liftable moving wheel framework 2301. The universal wheel lifting motor 2006 is installed on the universal wheel lifting motor bracket 2005, and is fixed on the liftable moving wheel framework 2301 through bolts. The mechanism can implement the rotation of the universal wheel 2003, drive the movement of the movable base 2, and can complete the lifting and lowering of the universal wheel 2003 to enable the universal wheel to leave off the ground, thereby providing a better stability with no motion of the robot.

Figure 10:
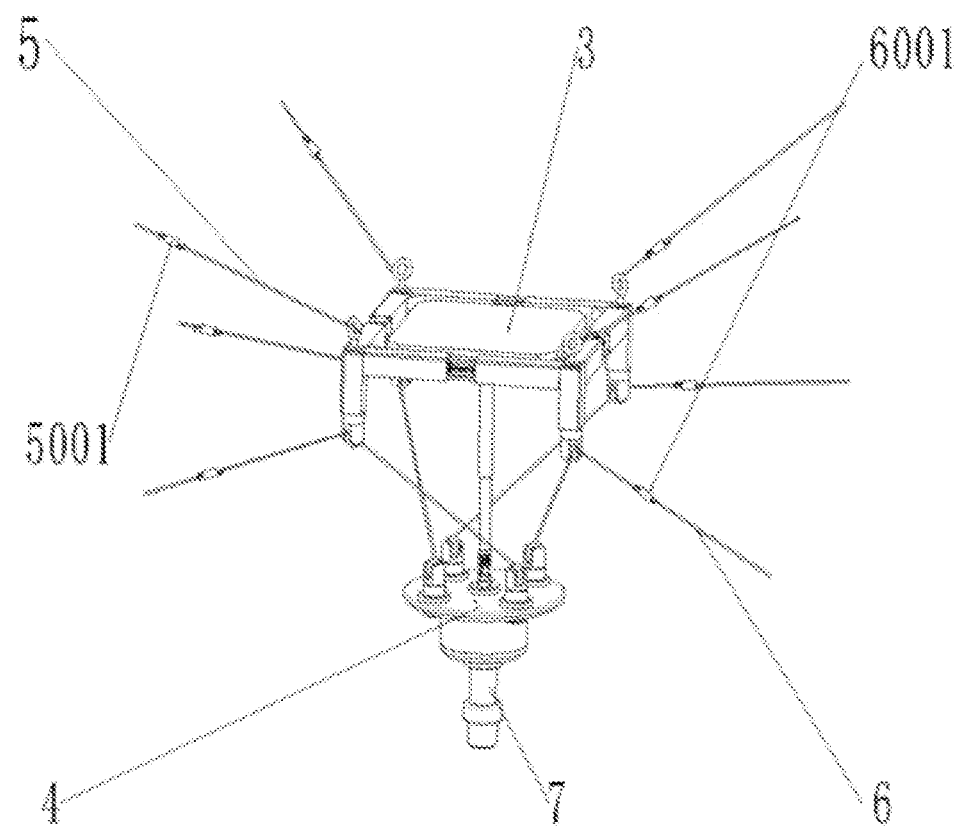
FIG. 10 illustrates a diagram of the entire structures of the adjustable auxiliary motion platform and the rotary motion platform.

With reference to FIG. 10, the adjustable auxiliary motion platform drive rope 5 is extended from the pulley 1101 on the drive rope position adjustment module 1 to connected with the adjustable auxiliary motion platform 3. The rotary motion platform drive rope 6 is extended from the movable pulley 1104 on the drive rope position adjustment module 1 to wind through the rotary motion platform drive rope transition pulley 3004 to connect with the rotary motion platform 4 eventually. The tension sensors of adjustable auxiliary motion platform drive ropes 5001 and the tension sensors of rotary motion platform drive ropes 6001 are respectively installed on the adjustable auxiliary motion platform drive ropes 5 and the rotary motion platform drive ropes 6, and configured to monitor and feed back the tension of the ropes in real time. The upper end of the hydraulic push rod 4001 is installed in the composite two-way hinge 3006 of the adjustable auxiliary motion platform 3, and the lower end of the hydraulic push rod 4001 is connected with the rotary platform rotating shaft 4201 through the universal joint 4003, and the hydraulic push rod transfers the motion between the adjustable auxiliary motion platform 3 and the rotary motion platform 4 under the limitations of the adjustable auxiliary motion platform drive rope 5 and rotary motion platform drive rope 6.

Figure 11A:
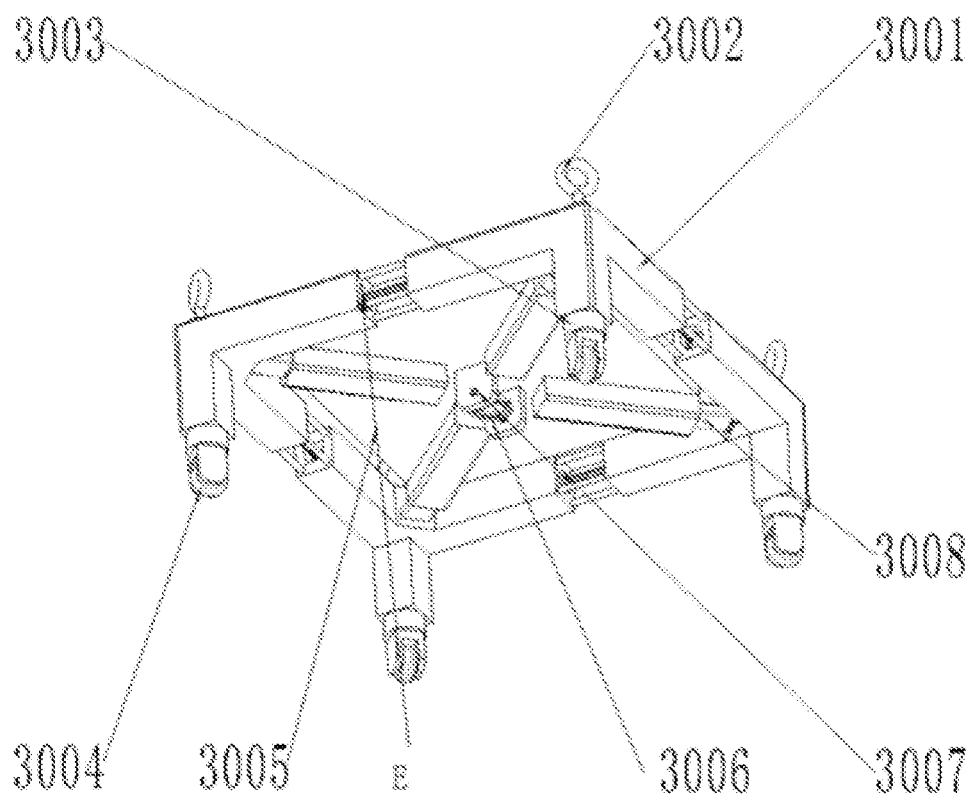
FIG. 11A illustrates a structural diagram of an adjustable auxiliary motion platform.
Figure 11B:
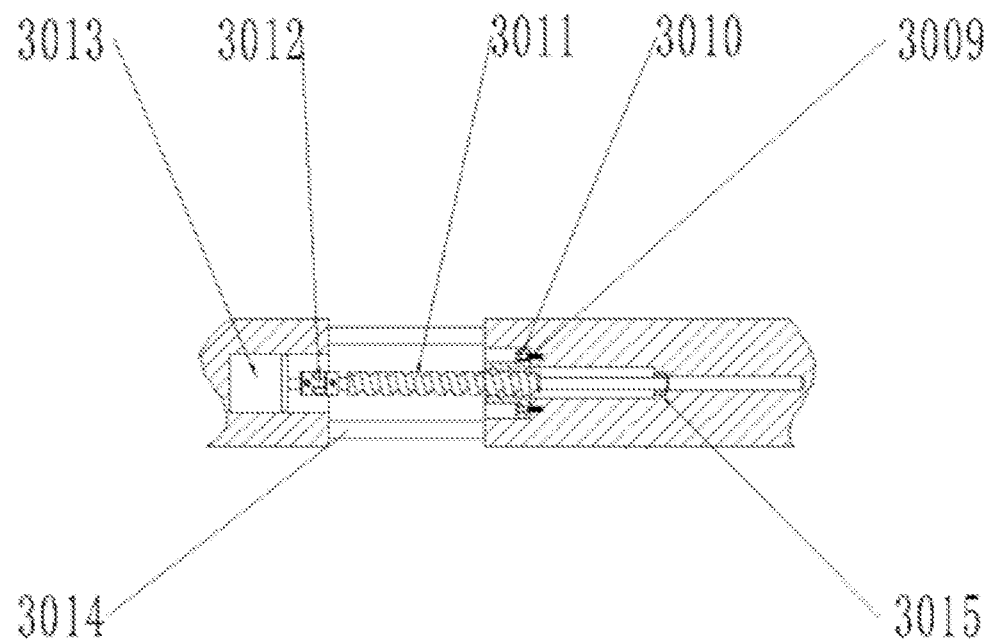
FIG. 11B illustrates an enlarged view of a partial structure at E in FIG. 11A.

With reference to FIG. 11A and FIG. 11B, the adjustable auxiliary motion platform 3 includes an adjustable auxiliary motion platform outer frame 3001, adjustable auxiliary motion platform drive rope hooks 3002, rotary motion platform drive rope transition pulley bases 3003, rotary motion platform drive rope transition pulleys 3004, an adjustable auxiliary motion platform inner plate 3005, a composite two-way hinge 3006, a two-way hinge installing bearing 3007, motion slide rails 3008, auxiliary motion platform lead screw nuts 3009, screws 3010, auxiliary motion platform ball lead screws 3011, external adjustment mechanism drive motor couplings 3012, external adjustment mechanism drive motors 3013 and external adjustment mechanism sliding column 3014.

Further, with reference to FIG. 11A, four adjustable auxiliary motion platform drive rope hooks 3002 are fixedly installed above the adjustable auxiliary motion platform outer frames 3001. Four rotary motion platform drive rope transition pulley bases 3003 are fixedly installed on the parts protruding from the bottoms of the adjustable auxiliary motion platform outer frames 3001, and the rotary motion platform drive rope transition pulleys 3004 are installed on the rotary motion platform drive rope transition pulley bases 3003. The motion slide rails 3008 are installed on the adjustable auxiliary motion platform outer frames 3001 through the screws, and the other ends of the motion slide rails 3008 are extended into the sliding grooves in the adjustable auxiliary motion platform inner plate 3005, so that the adjustable auxiliary motion platform outer frames 3001 are capable of moving along the motion slide rails 3008. The outer adjustable frame of the adjustable auxiliary motion platform 3 is composed of by four sets of identical adjustable auxiliary motion platform outer frames 3001 and the supporting components thereof, which is configured to adjust the size of the adjustable auxiliary motion platform 3, thereby changing the positions of the traction points of the drive ropes to adapt to the workpieces of different sizes, and preventing the interferences between the rotary motion platform drive ropes 6 and the workpiece. The composite two-way hinge 3006 having two-rotational-degree-of-freedom is installed in the two-way hinge installing bearing 3007 in the bearing seat hole on the adjustable auxiliary motion platform inner plate 3005. The adjustable auxiliary motion platform 3 prevents the adjustable auxiliary motion platform 3 from interfering with the workpiece by changing the spatial position and attitude of the rotary motion platform drive ropes 6. And the supporting components for placing the spray gun mechanism such as the feeding system can be installed on the adjustable auxiliary motion platform 3 to implement the movements of the feeding system with the spray gun 7, which improves the practical operability of the system. The feeding system is equivalent to the counterweight of the adjustable auxiliary motion platform 3, which improves the working stability of the adjustable auxiliary motion platform 3 and is capable of counteracting the force of the hydraulic push rod 4001 and keeps the level of the adjustable auxiliary motion platform 3.

In further detail, with reference to FIG. 11B, the external adjustment mechanism drive motor 3013 is fixedly installed in the slot inside the adjustable auxiliary motion platform outer frame 3001, and is connected at one end of the auxiliary motion platform ball lead screw 3011 through the external adjustment mechanism drive motor coupling 3012 to drive the auxiliary motion platform ball lead screw 3011 to move, and a guide shaft is connected at the other end of auxiliary motion platform ball lead screw 3011, and is guidedly and rotatably installed in a stepped inner hole at the boundary beam on the adjustable auxiliary motion platform outer frame at the other side, and the sliding bearing 3015 configured to guide the guide shaft is installed in the stepped inner hole, and the auxiliary motion platform ball lead screw nut 3009 is screwed on the auxiliary motion platform ball lead screw 3011, the auxiliary motion platform ball lead screw nut 3009 is fixedly connected with the boundary beam of the adjustable auxiliary motion platform outer frame where the guide shaft is located through the bolt. The auxiliary motion platform ball lead screw is driven by the external adjustment mechanism drive motor to rotate and cooperated with the guiding of the sliding columns above and below the ball lead screw to implement the movement of the auxiliary motion platform lead screw nut, and the auxiliary motion platform lead screw nut 3009 is driven by the auxiliary motion platform ball lead screw 3011 for moving to implement the relative linear motion between two adjustable auxiliary motion platforms outer frames 3011, and achieve the purpose of adjusting the size of the adjustable auxiliary motion platform 3. The external adjustment mechanism sliding columns 3014 are respectively installed in the cylindrical sliding slots corresponding to two adjustable auxiliary motion platform outer frames 3001.

With reference to FIG. 12, FIG. 13A, FIG. 13B, FIG. 14A to FIG. 14C, the rotary motion platform 4 includes a hydraulic push rod 4001, a rotary motion platform cover plate 4002, a universal joint 4003, a rotary motion platform housing 4004, a set screw 4005, and rotary motion platform drive rope pulleys 4101, rotary motion platform drive rope pulley bases 4102, bearing upper end covers 4103, base rotating bearings 4104, pulley base rotating shafts 4105, rotating gaskets 4106, a rotary platform rotating shaft 4201, flexural springs 4202, flexural spring brackets 4203, a rotary motion platform bottom end cover 4204, a rotary platform upper bearing end cover 4205, a rotary platform upper bearing 4206, a rotary platform lower bearing end cover 4207, a rotary platform lower bearing 4208, and a steering angle sensor 4209.

Figure 12:
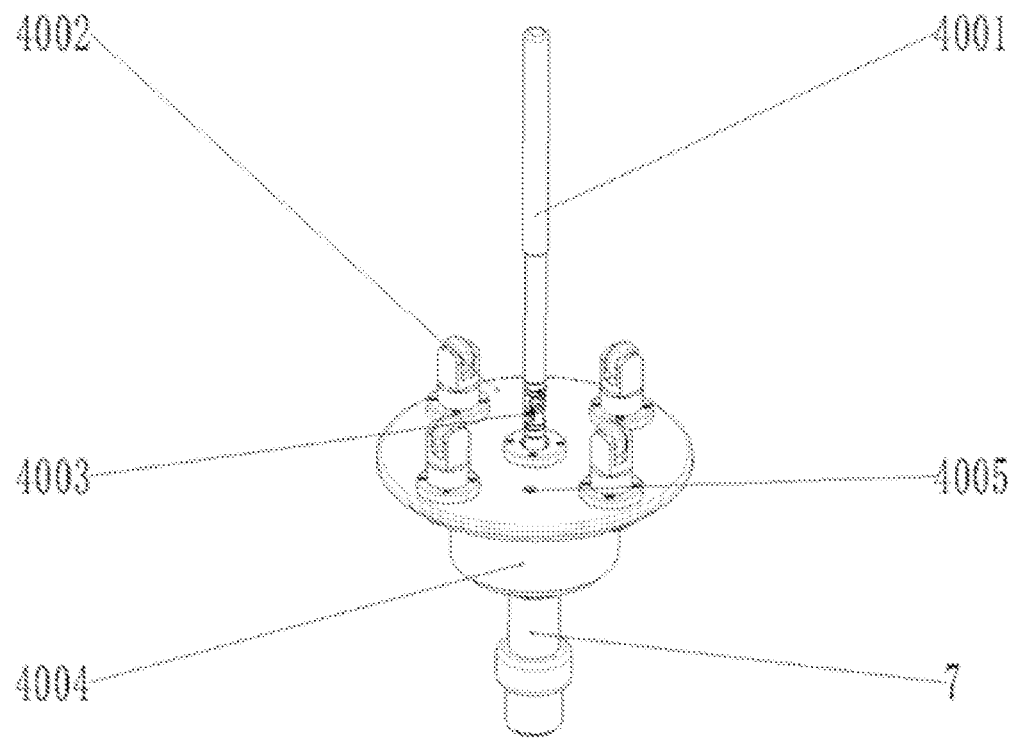
FIG. 12 illustrates a structural diagram of a rotary motion platform.

Further, with reference to FIG. 12, the upper end of the hydraulic push rod 4001 is installed in the composite two-way hinge 3006 of the adjustable auxiliary motion platform 3, the lower end of the hydraulic push rod 4001 is connected with the rotary motion rotating shaft 4201 through the universal joint 4003, the length of the hydraulic push rod 4001 is controllable, the adjustable auxiliary motion platform 3 is in series-connection in motion with the rotary motion platform 4 through the universal joint 4003, which constrains the movements of the rotary motion platform 4, and further improves the flexibility of the end. The rotary motion platform cover plate 4002 is fixed on the rotary motion platform housing 4004 through the set screw 4005. The spray gun 7 is connected at the lower end of the rotary motion platform housing 4004 through the screws. The four rotation motion platform drive ropes 6 are connected in a staggered manner to the four motion platform drive rope pulleys 4101 symmetrically distributed, the rotary motion platform 4 is capable of rotating around the rotary platform rotating shaft 4201 by means of staggered connection in combination with the spring rotary mechanism. The rotary motion platform 4 is capable of moving in the six-degree-of-freedom, compositely driven by the hydraulic push rod 4001 and the rotary motion platform drive ropes 6, in combination with the spring rotary mechanism inside the rotary motion platform 4, thereby driving the spray gun 7 installed on the rotary motion platform 4 to move.

Figure 13A:
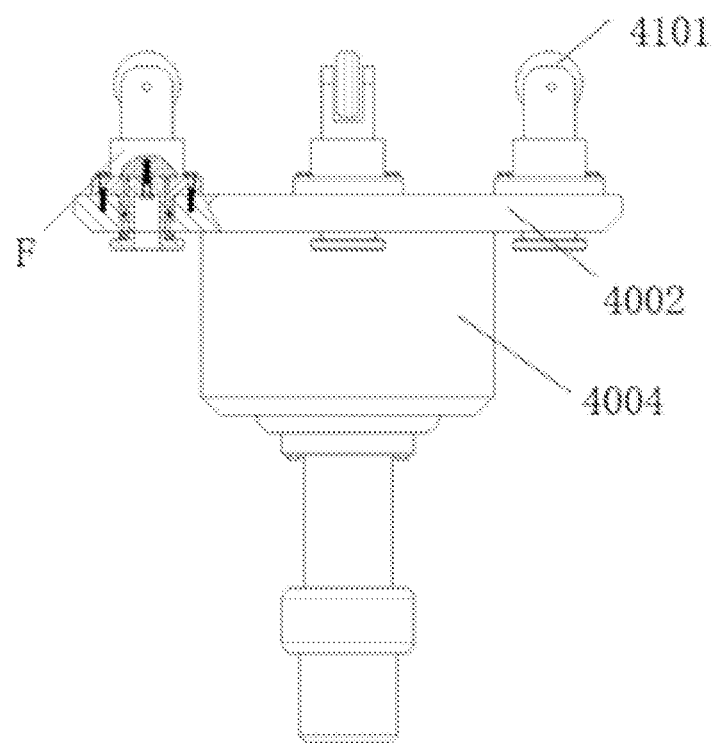
FIG. 13A illustrates a component diagram of a rotatable bearing seat.
Figure 13B:
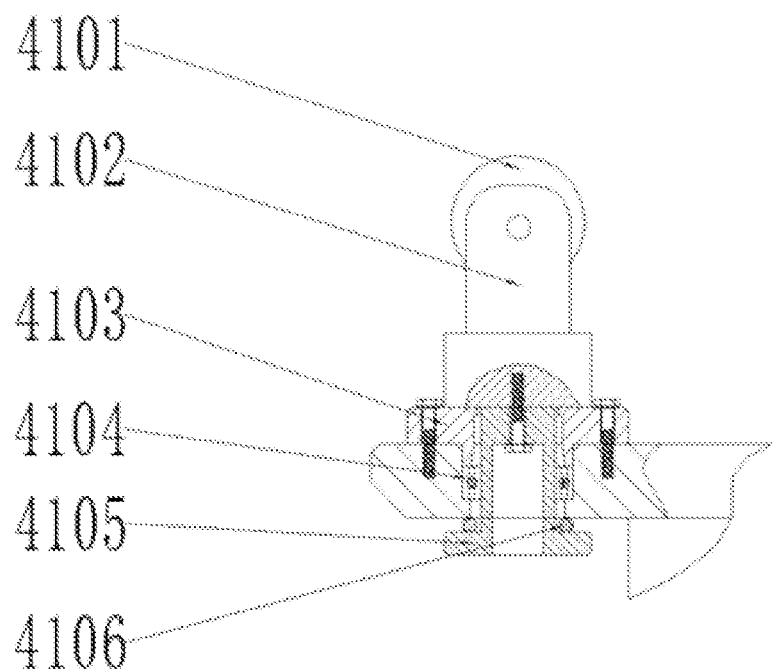
FIG. 13B illustrates an enlarged view of a partial structure at F in FIG. 13A.

In further detail, with reference to FIG. 12, FIG. 13A, and FIG. 13B, four sets of identical rotatably bearing seats are provided, and are evenly arranged on the rotary motion platform cover plate 4002. The rotary motion platform drive rope pulleys 4101 are installed in the rotary motion platform drive rope pulley bases 4102, and the rotary motion platform drive rope pulley bases 4102 and the bearing upper end covers 4103 are slidable relative to each other. The bearing upper end covers 4103 are fixedly connected on the rotary motion platform cover plate 4002 by the screws, and are abutted against the outer race of the base rotating bearing 4104 for limitation. The base rotating bearings 4104 are installed in the hole grooves on the rotary motion platform cover plate 4002. The pulley base rotating shafts 4105 are fixedly connected on the rotary motion platform drive rope pulley bases 4102 to implement the entire rotation of the rotatable bearing seat. Rotating gaskets 4106 are located in the pulley base rotating shafts 4105 and the rotary motion platform cover plate 4002, which plays a role of facilitating sliding. The self-adjustment of the rotatable bearing seat is implemented by the entire rotation of the rotatable bearing seat to cooperate with the change on the traction direction of the rotary motion platform drive ropes 6 during the movement.

Figure 14A:
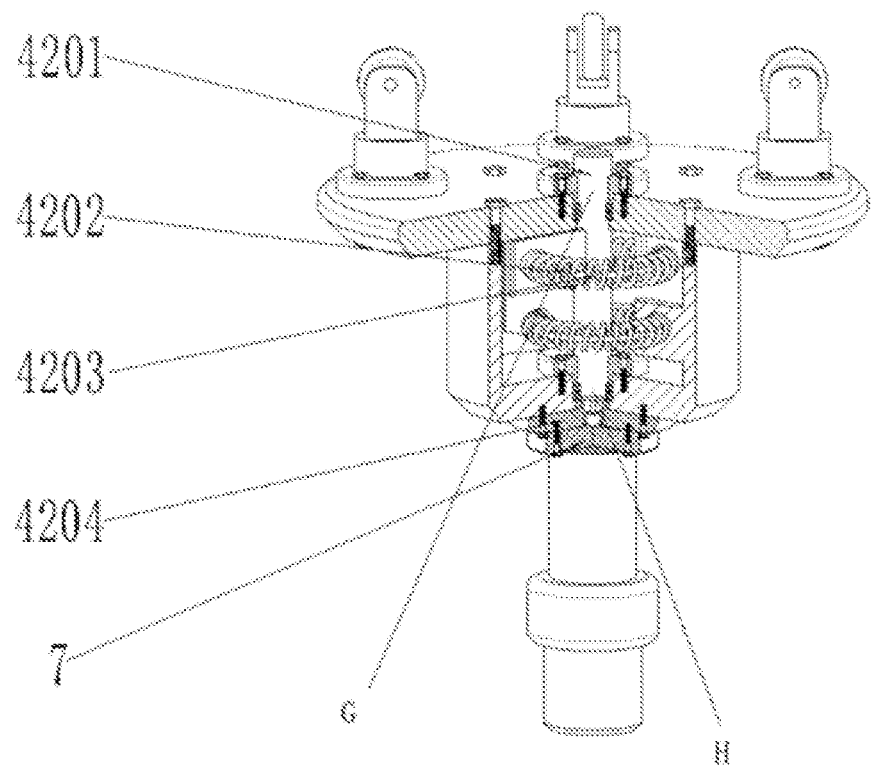
FIG. 14B illustrates an enlarged view of a partial structure at G in FIG. 14A.
FIG. 14C illustrates an enlarged view of a partial structure at H in FIG. 14A.
Figure 14B:
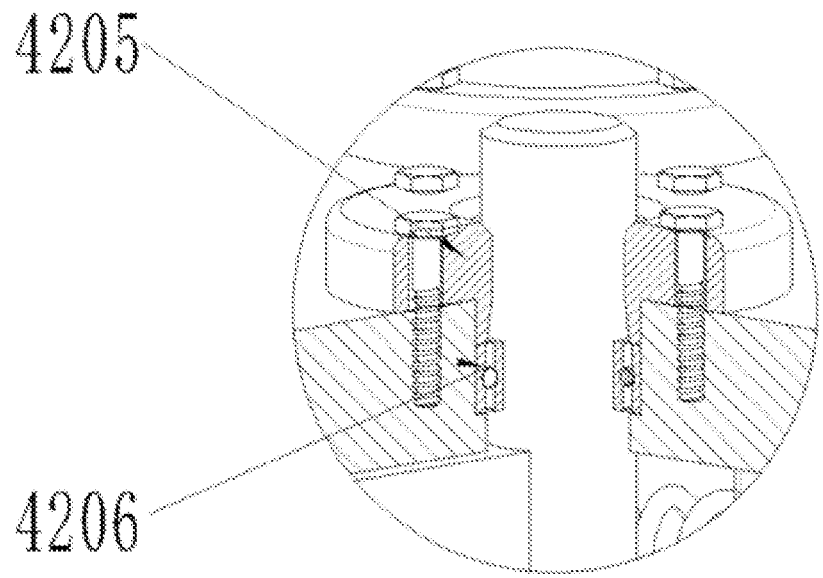
Figure 14C:
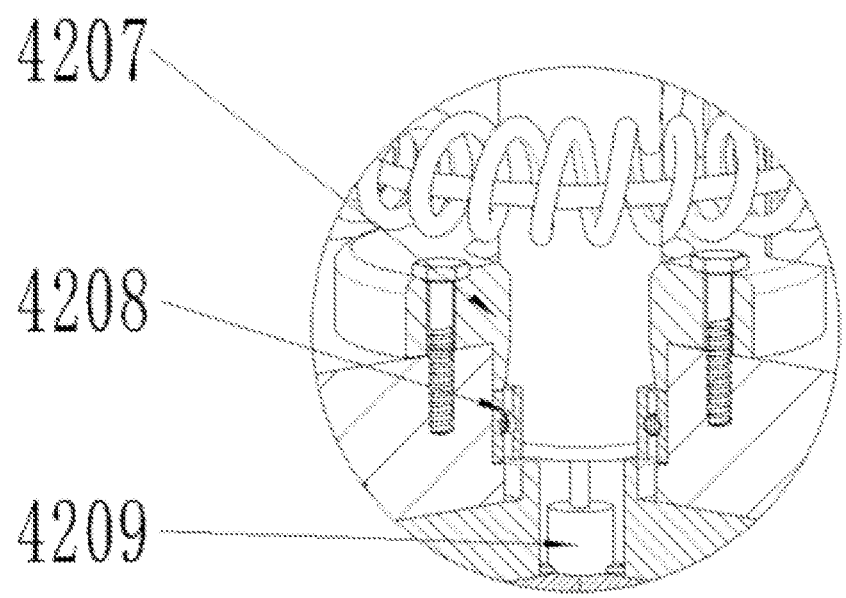
Figure 15:
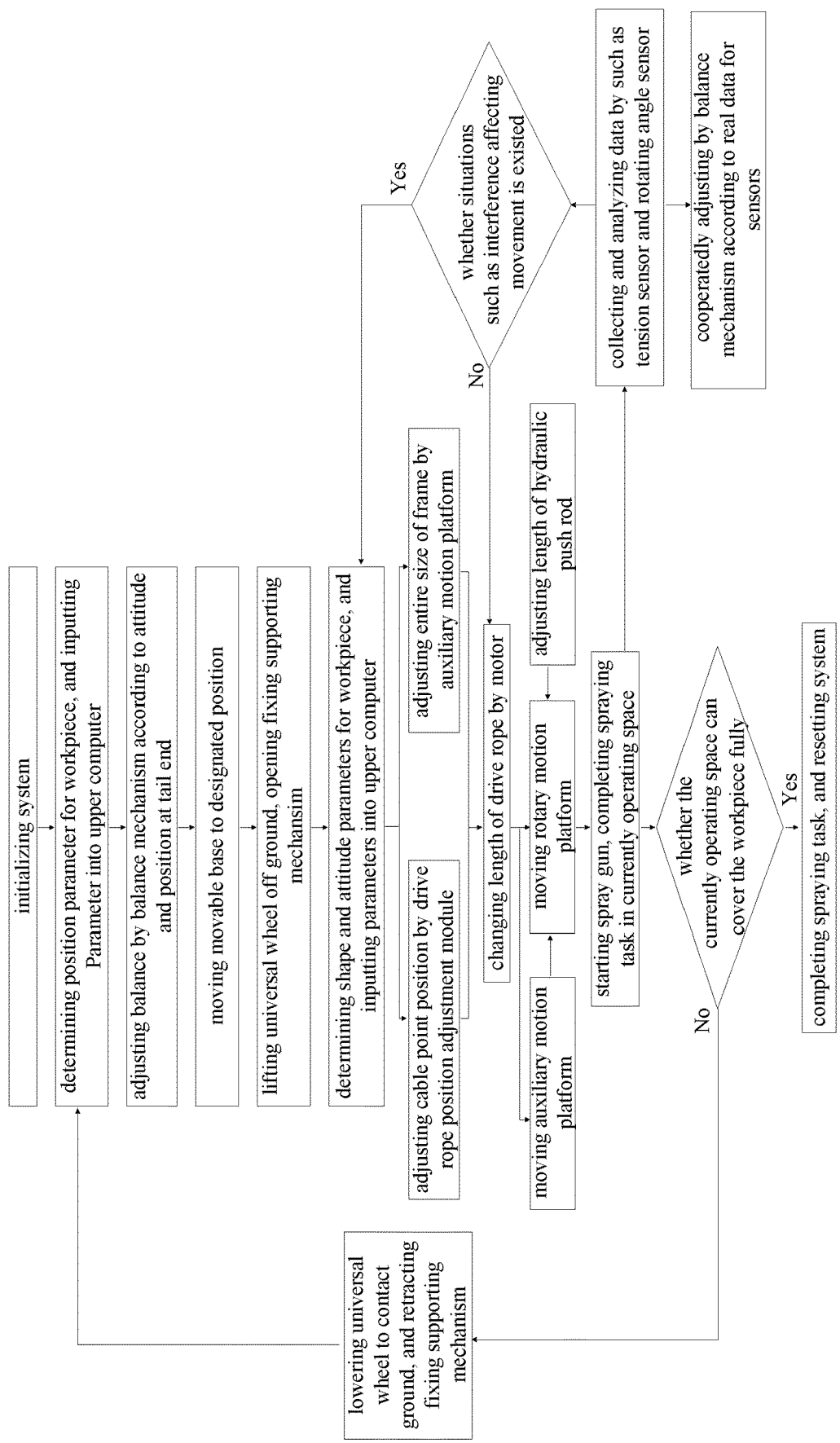
FIG. 15 illustrates a flowchart for controlling the mechanism.

In further detail, with reference to FIG. 14A to FIG. 14C, the rotary platform rotating shaft 4201 is integrally located inside the rotary motion platform housing 4004, and the rotating position of the rotary platform rotating shaft 4201 is restricted by the rotary platform upper bearing 4206 and the rotary platform lower bearing 4208, and the rotary platform rotating shaft 4201 and the rotary motion platform bottom end cover 4202 are slidable relative to each other, and is limited in position by the rotary motion platform bottom end cover 4202 in axial direction. An upper wing plate and a lower wing plate are protruded from the rotary platform rotating shaft 4201 and the rotary motion platform housing 4004. Taking the structure of the upper wing plate as an example, a ring-shaped flexural spring bracket 4203, passing through the hole grooves on the two wing plates and capable of rotating around the holes, is arranged between the upper wing plates on the rotary platform rotating shaft 4201 and the rotary motion platform housing 4004. The flexural springs 4202 are all semicircular, and one end of each of the flexural springs 4202 is connected on the wing plate of the rotary motion rotating shaft 4201, the other end of the flexural spring 4202 is connected on the wing plate of the rotary motion platform housing 4004, and a middle part of the flexural spring 4202 is passed through the flexural spring bracket 4203 for limitation, which cooperates with the action of the rotary motion platform drive rope 6 to provide a force for the rotation of the rotary motion platform 4. The connection method of the lower wing plate is the same as the upper one, but the position is staggered by 90 degrees, so that the elastic force can be superimposed when the upper and lower springs move, so as to make the movement more stable. The rotary platform upper bearing 4206 is installed and fixed in the hole at the middle of the rotary motion platform cover plate 4002 by the rotary platform upper bearing end cover 4205. The rotary platform lower bearing 4208 is installed and fixed in the hole on the bottom of the rotary motion platform housing 4004 by the rotary platform lower bearing end cover 4207. The rotary motion platform bottom end cover 4204 is connected on the bottom of the rotary motion platform housing 4004 by the screw. The spray gun 7 is installed below the rotary motion platform bottom end cover 4204 by the screws. The base of steering angle sensor 4209 is fixedly connected to the spray gun 7 through the screws, and the measuring shaft is connected to the rotary platform rotating shaft 4201. So that the steering angle of the rotary motion platform 4 relative to the rotary platform rotating shaft 4201 can be obtained through the steering angle of the steering angle sensor measuring shaft relative to the base thereof.

With reference to FIG. 1 to FIG. 15, the functions of the present disclosure is generally described. The present disclosure includes four sets of drive rope position adjustment modules 1, four sets of movable bases 2, an adjustable auxiliary motion platform 3, a rotary motion platform 4, four adjustable auxiliary motion platform drive ropes 5, and four rotary motion platform drive ropes 6 and the spray gun 7, and the entire workflow of which is as follows.

In S1, a workpiece to be sprayed is placed in a fixed position, and a position parameter for the workpiece is determined and inputted into an upper computer of a control system.

In S2, a position of a main area in the operating space is determined by the upper computer according to the position parameter for the workpiece, and the balance mechanism in the moveable base 2 is controlled by the upper computer to start, the balance mechanism counterweight 2206 is adjusted to balance the tension according to the position and the shape of the mechanism, and the universal wheels 2003 in the four sets of the movable bases 2 are controlled to move so as to drive the robot to move to a designated area as a whole.

In S3, the universal wheels 2003 in the four sets of moveable bases are all lifted off the ground after the moveable bases 2 move to the designated area, and the fixing supporting mechanism is opened.

In S4, the shape and the attitude parameters for the workpiece to be sprayed are inputted into the upper computer for analyzing.

In S5, the movable pulleys 1004 is driven by the four sets of the drive rope position adjustment modules to move up and down to adjust the position of the outlet cable point, through the movement of the synchronous belt mechanisms in the drive rope position adjustment modules under the control of the upper computer, according to the shape and the attitude parameters for the workpiece to be sprayed, and the auxiliary motion platform is driven by the outer adjustment mechanism drive motor 3013 to adjust the entire size of the frame to adapt to the processing requirements for the workpieces with different shapes and sizes.

In S6, the adjustable auxiliary motion platform drive ropes 5 and the rotary motion platform drive ropes 6 are driven by the left drive rope servo motor 1201 and the right drive rope servo motor 1206 in each set of the drive rope position adjustment modules 1 to change the length so as to control the auxiliary motion platform and the rotary motion platform to move after the preparing steps are completed, and while the rotary motion platform is driven by the hydraulic push rod 4001 to move.

In S7, the spray gun 7 is moved with the movement of the rotary motion platform to complete the feasible spraying task in the currently operation space. The data are collected by the tension sensors and the steering angle sensors 4209 and the like, and are inputted into the upper computer to control the position of the balance mechanism counterweight 2206 to adjust with the movement of the end to balance the tensions of the ropes to prevent the mechanism from rolling over and meanwhile, ensure that the interference and other conditions affecting the movement are not existed.

In S8, the spraying task for the entire workpiece cannot be completed when the workpiece is too large to be covered by the robot through one movement of each of the movable bases. At this time, the fixed state of the robot is resolved by the movable bases to move to a new operation position, and steps are started from S2 until the spraying task for the overall workpiece is complete.

The above descriptions are only preferred embodiments in the present disclosure and are not intended to limit the present disclosure. Any modifications, equivalent replacements and improvements made within the spirit and principles of the present disclosure shall be included in the protection scope of the present disclosure.

What is claimed is:

1. A movable electro-hydraulic composite drive spraying robot with a large operating space comprising a plurality of movable bases, drive rope adjustment modules, an adjustable auxiliary motion platform, a rotary motion platform, and adjustable auxiliary motion platform drive ropes and rotary motion platform drive ropes;

wherein a liftable universal wheel assembly is installed at a bottom end of each of the plurality of movable bases, and the drive rope adjustment modules are cooperatively installed on the plurality of movable bases, a number of the drive rope adjustment modules is equal to a number of the plurality of movable bases, profile supporting columns in the drive rope adjustment modules are respectively fixed on the plurality of movable bases, and an operating space is formed by the plurality of movable bases, the adjustable auxiliary motion platform that is movable is erected in the operating space, the adjustable auxiliary motion platform is driven by the adjustable auxiliary motion platform drive ropes to move, the rotary motion platform is arranged below the adjustable auxiliary motion platform, the rotary motion platform is compositely-driven by the rotary motion platform drive ropes and a hydraulic push rod installed between the adjustable auxiliary motion platform and the rotary motion platform to move, so that a precise control of a multi-degree-of-freedom motion of the rotary motion platform is implemented, a spray gun is installed on a bottom end surface of the rotary motion platform, and balance mechanisms and fixing supporting mechanisms configured to balance traction forces of the ropes and maintain a balance of the movable electro-hydraulic composite drive spraying robot are further installed on the plurality of movable bases.

2. The movable electro-hydraulic composite drive spraying robot with the large operating space according to claim 1, wherein the number of the drive rope adjustment modules is four, each of the drive rope adjustment modules comprises one of the profile supporting columns, and a pulley configured to bear the adjustable auxiliary motion platform drive rope is installed on a top end part of each of the profile supporting columns through a fixed pulley fixing base, a bottom end of the adjustable auxiliary motion platform drive rope is wound on a winding shaft of a motor drive, a synchronous belt vertically arranged is installed on each of the profile supporting columns below the fixed pulley fixing base, a movable pulley configured to bear the rotary motion platform drive rope is installed on the synchronous belt, and a bottom end of the rotary motion platform drive rope is wound on a winding shaft of another motor drive.

3. The movable electro-hydraulic composite drive spraying robot with the large operating space according to claim 1, wherein each of the plurality of movable bases comprises a movable base body, a movable base body cover plate is installed on the movable base body, one of the fixing supporting mechanisms is installed inside the movable base body surroundedly, the one of the fixing supporting mechanisms comprises fixing supporting plates arranged at intervals, the fixing supporting plates are rotated to parallel to ground by a manual operation and locked to increase a stability of the movable electro-hydraulic composite drive spraying robot, the corresponding balance mechanism is installed on an upper end surface of the movable base body cover plate.

4. The movable electro-hydraulic composite drive spraying robot with the large operating space according to claim 3, wherein rotating shafts are arranged on two sides of each of the fixing supporting plates, and the fixing supporting plate is rotated around the rotating shafts, the movable base body is provided with positioning holes corresponding to the rotating shafts, the rotating shafts are rotatably installed in the positioning holes through fixing-supporting-plate rotating bearings, the movable base body below the positioning holes is provided with square grooves, retaining springs are arranged in the square grooves, and the retaining springs are connected with spring resistance buckles arranged in elastic guide;

each of the balance mechanisms comprises a balance mechanism rotating platform, one end of the balance mechanism rotating platform is rotatably installed on the movable base body cover plate through a balance mechanism rotating shaft, the balance mechanism rotating shaft is driven by a balance mechanism rotating motor to rotate, a balance mechanism lead screw is rotatably installed inside the balance mechanism rotating platform, a balance mechanism lead screw slider is guidedly installed on the balance mechanism lead screw, a counterweight bearing platform is installed on the balance mechanism lead screw slider, a balance mechanism counterweight is installed on the counterweight bearing platform, spherical joints are respectively installed on both sides of a bottom end of the balance mechanism lead screw slider, a rotating end of each of the spherical joints is connected with a telescopic supporting rod, and a two-way hinge is installed at another end of the telescopic supporting rod, the two-way hinge is connected inside a bearing of the corresponding positioning hole of the movable base body, and the balance mechanism lead screw is driven by a balance mechanism lead screw drive motor at an end of each of the balance mechanisms;

each of the universal wheel assembly comprises a liftable moving wheel frame, a top part of the liftable moving wheel frame is fixedly installed on a bottom part of the movable base body, and a universal wheel drive motor bracket capable of guidedly-moving is installed inside the liftable moving wheel frame, a universal wheel drive motor is fixedly installed on the universal wheel drive motor bracket, and a universal wheel is installed at an output shaft end of the universal wheel drive motor, and the universal wheel drive motor bracket is driven by a universal wheel lifting ball lead screw nut to lift and lower and is guided by a universal wheel lifting sliding column.

5. The movable electro-hydraulic composite drive spraying robot with the large operating space according to claim 1, wherein each of the adjustable auxiliary motion platform drive ropes is driven by one motor in the corresponding drive rope adjustment module to protrude from the corresponding drive rope adjustment module to connect on an adjustable auxiliary motion platform drive rope hook, so as to drive the adjustable auxiliary motion platform to move; each of the rotary motion platform drive ropes is driven by another motor in the corresponding drive rope adjustment module to protrude from the corresponding drive rope adjustment module to wind through a transition pulley on the adjustable auxiliary motion platform, so as to restrict and adjust a spatial position of the rope, and eventually each of the rotary motion platform drive ropes is connected to the rotary motion platform to drive the rotary motion platform to move together with the hydraulic push rod; and rope tension sensors configured to monitor and feed back rope tensions in real time are installed on the adjustable auxiliary motion platform drive ropes and the rotary motion platform drive ropes respectively.

6. The movable electro-hydraulic composite drive spraying robot with the large operating space according to claim 5, wherein the adjustable auxiliary motion platform comprises an adjustable auxiliary motion platform inner plate, an adjustable auxiliary motion platform outer frame with adjustable size is installed outside the adjustable auxiliary motion platform inner plate, the adjustable auxiliary motion platform drive rope hooks symmetrically distributed in a rectangular shape are installed on an upper end surface of the adjustable auxiliary motion platform outer frame, rotary motion platform drive rope transition pulley bases configured to install transition pulleys distributed in a circumference are installed on a bottom end part of the adjustable auxiliary motion platform outer frame, each side of the adjustable auxiliary motion platform outer frame is disconnected at a middle part and disconnected parts of each side are abutted and adjusted through an auxiliary motion platform ball lead screw therebetween, and the adjustable auxiliary motion platform is guided through a moving slide rail distributed in radial during adjustment.

7. The movable electro-hydraulic composite drive spraying robot with the large operating space according to claim 6, wherein one end of the auxiliary motion platform ball lead screw is connected with an output shaft end of an outer adjustment mechanism drive motor through a coupling, the outer adjustment mechanism drive motor is installed in a slot at a boundary beam of the adjustable auxiliary motion platform outer frame at a disconnected side, a guide shaft is connected at another end of the auxiliary motion platform ball lead screw, the guide shaft is guidedly and rotatably installed in a sliding bearing in a stepped inner hole at a boundary beam of the adjustable auxiliary motion platform outer frame at another side, the auxiliary motion platform ball lead screw is screwed with an auxiliary motion platform lead screw nut, the auxiliary motion platform lead screw nut is fixedly connected to a boundary beam of the adjustable auxiliary motion platform outer frame where the guide shaft is located through screws, the auxiliary motion platform ball lead screw is driven by the outer adjustment mechanism drive motor to rotate and cooperated with the guiding of a sliding column above and below the ball lead screw to move the auxiliary motion platform lead screw nut, so that the boundary beam of the adjustable auxiliary motion platform outer frame at another side is driven for moving to adjust the adjustable auxiliary motion platform outer frame, the moving slide rail comprises an outer sleeve pipe and an inner pipe body that are guided and cooperated with each other, the outer sleeve pipe is fixed on a bottom end surface of the adjustable auxiliary motion platform inner plate, and an end of the inner pipe body is connected with the adjustable auxiliary motion platform outer frame.

8. The movable electro-hydraulic composite drive spraying robot with the large operating space according to claim 1, wherein a rotary platform rotating shaft is rotatably installed at a middle of the rotary motion platform, and an upper end of the rotary platform rotating shaft is connected to a bottom end part of the hydraulic push rod through a universal joint, pulley bases arranged at intervals are installed on an upper end surface of the rotary motion platform in a circumferential direction, rotary motion platform drive rope pulleys are installed on the pulley bases, a rotary motion platform housing is installed on bottom end surfaces of the rotary motion platform drive rope pulleys, and a lower end part of the rotary platform rotating shaft is located inside the rotary motion platform housing, and steering angle sensors configured to measure an angle of the rotary motion platform relative to the rotary platform rotating shaft and a flexural spring configured to complete a rotational movement in cooperation are further installed inside the rotary motion platform housing.

9. The movable electro-hydraulic composite drive spraying robot with the large operating space according to claim 8, wherein a pulley base rotating shaft is installed at a bottom end of each of the pulley bases, and an upper end part of the pulley base rotating shaft is rotatably press-fitted on the rotary motion platform through a rotary platform upper bearing and a rotary platform upper bearing end cover, a lower end part of the pulley base rotating shaft is rotatably press-fitted at a middle part of the rotary motion platform housing through a rotary platform lower bearing and a rotary platform lower bearing end cover, two wing plates arranged in a staggered manner are protruded from the rotary platform rotating shaft and the rotary motion platform housing, a flexural spring bracket that is circular-ring-shaped is arranged between upper wing plates of the rotary platform rotating shaft and the rotary motion platform housing, and the flexural spring bracket passing through holes on the two wing plates is slidable around the holes, the flexural spring is sleeved on the spring bracket, and the flexural spring is all semicircular, and one end of the flexural spring is connected to one of the two wing plates of the rotary platform rotating shaft, and another end of the flexural spring is connected to one of the two wing plates of the rotary motion platform housing, and a middle of the flexural spring is passed through the flexural spring bracket to limit, and cooperated with an action of the rotary motion platform drive ropes to supply a force for a rotation of the rotary motion platform, the four flexural springs divided into two groups are respectively arranged on two groups of the wing plates in an upper-lower staggered manner to improve a stability of the flexural springs at different rotation angles, a rotary motion platform bottom end cover is installed on a bottom end part of the rotary motion platform housing, and a spray gun is installed at a bottom end of the rotary motion platform bottom end cover.

10. The movable electro-hydraulic composite drive spraying robot with the large operating space according to claim 1, wherein a workflow of the movable electro-hydraulic composite drive spraying robot is specifically as follows:
   S1, initializing a system, placing a workpiece to be sprayed in a fixed position, determining a position parameter for the workpiece, and inputting the position parameter into an upper computer of a control system;
   S2, determining, by the upper computer, a position of a main area in the operating space according to the position parameter for the workpiece; starting the balance mechanisms in the plurality of movable bases, and adjusting, according to a position and a shape of the mechanism, counterweights to balance tensions; and driving, by each of the plurality of movable bases, the movable electro-hydraulic composite drive spraying robot to move as a whole to a designated area;
   S3, lifting, after the plurality of movable bases are moved to the designated area, universal wheels in each of the plurality of movable bases off a ground, and opening the fixing supporting mechanisms;
   S4, inputting shape and attitude parameters for the workpiece to be sprayed into the upper computer for analyzing;
   S5, driving, under a control of the upper computer, a drive rope position adjustment module to adjust an outlet cable point position according to approximate shape and attitude parameters for the workpiece to be sprayed; while adjusting the adjustable auxiliary motion platform and adjusting an entire size of a frame to adapt to processing requirements for workpieces of different shapes and sizes;
   S6, changing, under driving of a motor, a length of the drive rope to control the adjustable auxiliary motion platform and the rotary motion platform to move, and while driving, by the hydraulic push rod, a movement of the rotary motion platform;
   S7, moving, during the movement of the rotary motion platform, the spray gun with the movement of the rotary motion platform, and completing a feasible spraying task in a current operating space; collecting, by tension sensors and steering angle sensors and the like, data and outputting the data into the upper computer to control the balance mechanisms to adjust with a movement of a tail end; thereby preventing the movable electro-hydraulic composite drive spraying robot from rolling over and ensuring that an interference and conditions affecting the movement are not existed; and
   S8, resolving, by the plurality of movable bases, a fixed state of the movable electro-hydraulic composite drive spraying robot to move to a new operating position, and restarting from S2 until completing a spraying task for an entire workpiece, when the entire workpiece is too large to be fully covered by the movable electro-hydraulic composite drive spraying robot through one movement of each of the plurality of movable bases.

\* \* \* \* \*